United States Patent [19]

Tsuchiya et al.

[11] Patent Number: 5,231,579
[45] Date of Patent: Jul. 27, 1993

[54] METHOD AND SYSTEM FOR DISPLAYING AND PROCESSING IMAGE OF FORM DOCUMENT

[75] Inventors: Masayuki Tsuchiya, Hiratsuka; Hiroshi Fujise, Yokohama; Hitoshi Suzuki, Owariasahi, all of Japan

[73] Assignees: Hitachi, Ltd., Tokyo; Hitachi Software Engineering Co., Ltd., Yokohama, both of Japan

[21] Appl. No.: 689,071
[22] PCT Filed: Oct. 19, 1990
[86] PCT No.: PCT/JP90/01354
§ 371 Date: Jun. 20, 1991
§ 102(e) Date: Jun. 20, 1991
[87] PCT Pub. No.: WO91/06057
PCT Pub. Date: May 2, 1991

[30] Foreign Application Priority Data

Oct. 20, 1989 [JP] Japan .................. 1-271687
Mar. 19, 1990 [JP] Japan .................. 2-067149

[51] Int. Cl.⁵ .................. G06F 15/38; G06F 15/20; G06F 3/14
[52] U.S. Cl. .................. 364/419; 395/148; 395/161
[58] Field of Search .................. 364/419, 518, 900 MS

[56] References Cited

U.S. PATENT DOCUMENTS 4,555,759 11/1985 McCaskill et al. .................. 364/900
4,608,662 8/1986 Watanabe et al. .................. 364/900
4,789,962 12/1988 Berry et al. .................. 364/900
4,992,954 2/1991 Takeda et al. .................. 364/518

OTHER PUBLICATIONS

Working with Word, 2nd edition by Chris Kinata 1988, pp. 177-184; 350-355 & 444-446.

Primary Examiner—Roy N. Envall, Jr.
Assistant Examiner—Frantzy Poinvil
Attorney, Agent, or Firm—Antonelli, Terry, Stout & Kraus

[57] ABSTRACT

Method and system for dispensing a document form including input/output fields into which a character train or a numerical value data train is written on a screen such that the operator can easily correct it on the screen or by a format such that data can be easily input/output into/from the input/output fields thereof for processing. describing a format of the document is read out of a recording medium in which the document format has been written, the read data is displayed on the screen with a format which is the same as or similar to the format written on the recording medium. When the document form is displayed on the screen a character size per character displayed is decided from the read data, the cell is arranged on the basis of the decided character size, extra-cell data such as character or numerical value data or the like is arranged on the basis of the arranged cell, the cell and the extra-cell data are compressed so as not to overflow the display screen, and a processing procedure of items of the format displayed in the display screen is determined.

14 Claims, 30 Drawing Sheets

| | 項目情報 |  |  |  |
|---|---|---|---|---|
| 1900 | 項目名 | MMMMMMMMMMMMMMMMMM | | |
| 1901 | 項目位置 | 縦 XXXXX 1/10mm | 横 XXXXX 1/10mm | |
| 1902, 1903 | 項目長 | 行数 XXX行 | 桁数 XXX桁 | |
| 303C, 303D | 文字間隔 | 行間 XXXXX 1/10mm 列間 XXXXX 1/10mm | | |
| RECOGNITION DATA | 属性 | X 〈1:数値 2:英数 3:漢字〉 | | |
| 1904 | 入出力 | X 〈1:入力 2:出力 3:入出力〉 | | |
| 1905 | 形態 | X 〈1:見出し 2:明細 3:総括〉 | | |
| 1906 | | 明細情報 | | |
| 1907 | 反復回数 | 縦方向 XXX回 | 横方向 XXX回 | |
| 1908 | 反復間隔 | 縦間隔 XXXX 1/10mm | 横間隔 XXXX 1/10mm | |
| 1909 | 合計回数 | XXXXX回 | | |
| 1910, 1911 | | 編集情報 | | |
| 1912 | | 印字方向 X 〈1:縦 2:横〉 | | |
| 1913 | 手 | X 〈1:あり 2:なし〉 | | |
| 1914 | 詰め | X 〈1:あり 2:なし〉 | | |
| 1915 | 拡大 | X | X 〈1:右 2:左 3:中央 4:じなし〉 | |
| 1916 | | X | X 〈1:横 2:縦 3:縦横 4:じなし〉 | |
| 1917 | 桁合わせ | XXXX 〈-18~18 0:じなし〉 | | |

DISPLAY CORRECTION RESULT ← CORRECTION

CELL DATA

| | CHARACTER TRAIN | START POSITION 1/10mm | END POSITION 1/10mm |
|---|---|---|---|
| 3100 | CUSTOMER NAME | (350,120) | (420,220) |
| 3101 | | (420,120) | (920,220) |
| 3102 | CODE | (350,320) | (650,420) |
| 3103 | ARTICLE NAME | (650,320) | (950,420) |
| ⋮ | ⋮ | ⋮ | ⋮ |

OUT-OF-CELL DATA

| | CHARACTER TRAIN | START POSITION 1/10mm | END POSITION 1/10mm |
|---|---|---|---|
| 3200 | DELIVERY STATEMENT | (400,50) | (500,110) |
| 3201 | MONTH | (1120,120) | (1200,130) |
| 3202 | DAY | (1300,120) | (1400,130) |
| ⋮ | ⋮ | ⋮ | ⋮ |

FIG. 23
```
      START
        │
        ▼
┌──────────────────┐ ,2200
│ OBTAIN SIZE OF ONE│
│ CHARACTER ON      │
│ DOCUMENT PER CHAR-│
│ ACTER ON DISPLAY  │
└──────────────────┘
        │
        ▼
┌──────────────────┐ ,2201
│ EXTRACT ENLARGE- │
│ MENT CHARACTER   │
└──────────────────┘
        │
        ▼
       END
```
FIG. 24
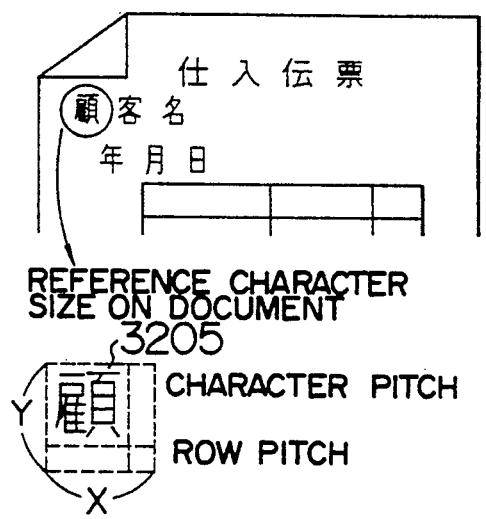
FIG. 25
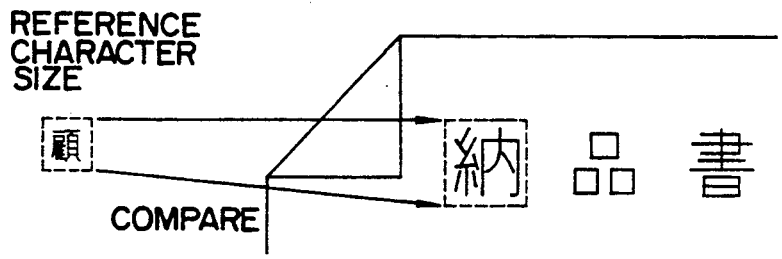

POSITION ON DOCUMENT
    (START ROW(1/10mm), START COLUMN (1/10mm))
    (END ROW (1/10mm), END COLUMN (1/10mm))

POSITION ON SCREEN
    (START ROW NUMBER, START COLUMN NUMBER)
    (END ROW NUMBER, END COLUMN NUMBER)

ROW NUMBER = ROW(1/10mm) ÷ REFERENCE CHARACTER SIZE
COLUMN NUMBER = COLUMN(1/10mm) ÷ REFERENCE SIZE

F I G. 30
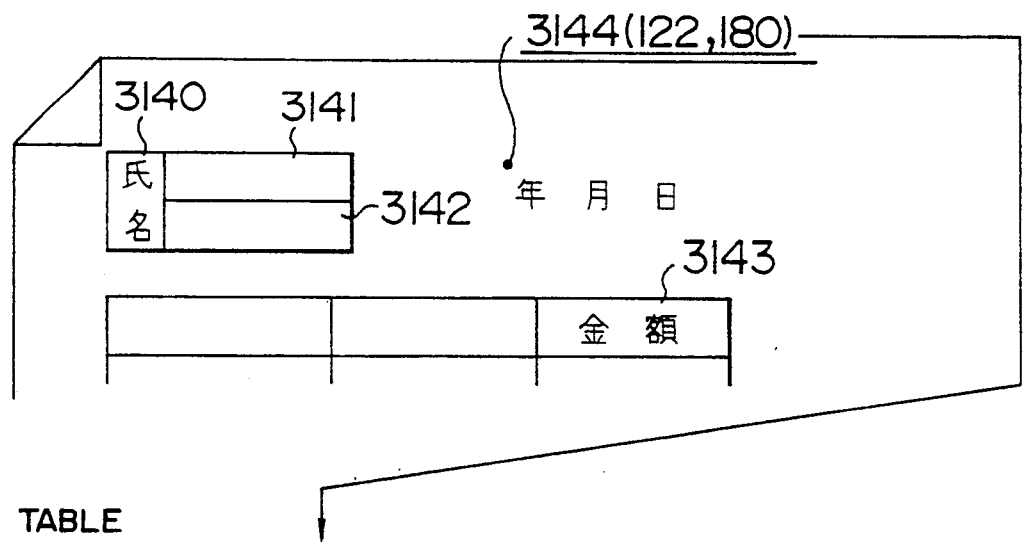
SET YEAR, MONTH, AND DAY INTO
122≑120 → 2ND ROW
180≑185 → 8TH COLUMN F I G. 31
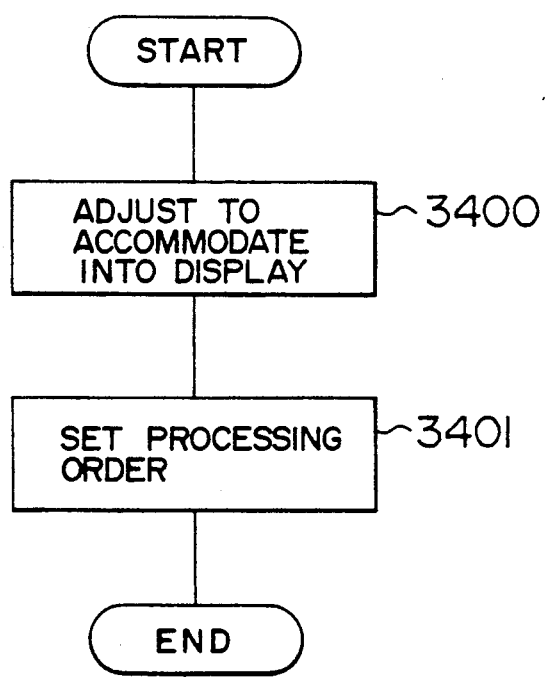

F I G. 33
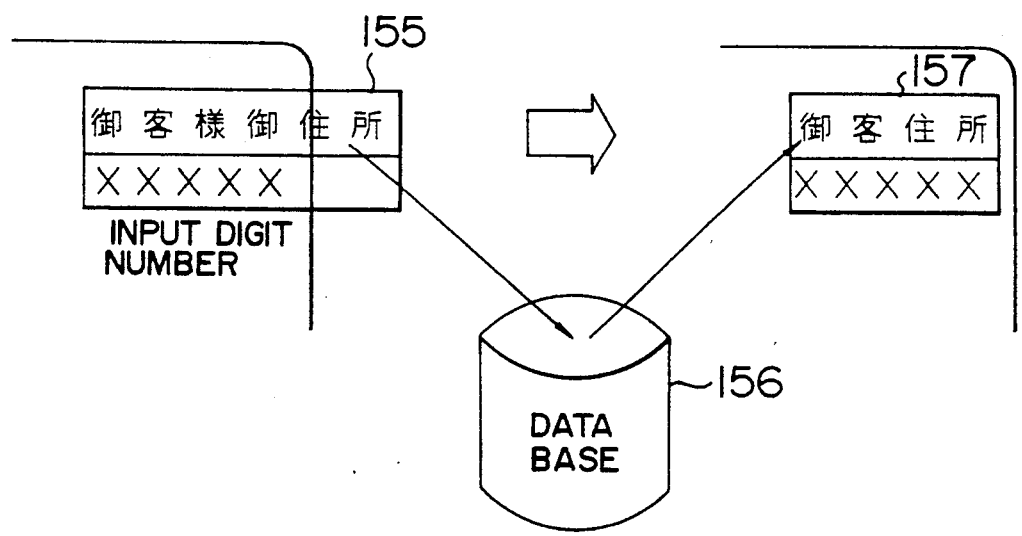
F I G. 34
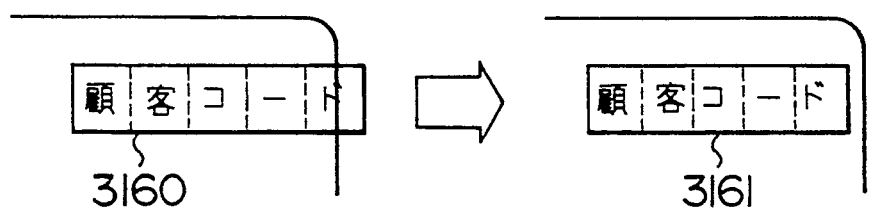

METHOD AND SYSTEM FOR DISPLAYING AND PROCESSING IMAGE OF FORM DOCUMENT

TECHNICAL FIELD

The invention relates to a method and system for processing data of a form document using image data and, more particularly, to a method and system for automatically making and processing a computer processing image from a document with a predetermined format which is used in, for instance, a general office work processing field and has blank columns to input or output character data, numeral data, and the like.

BACKGROUND

In the case where, for instance, various written application forms, data input slips, bill slips, receipts, or documents having predetermined forms for accounts, statistics, specification, or the like are issued or data is input into a data base by using the format of the document displayed on the screen by using an office apparatus such as a work station, office processor, personal computer, word processor, or the like, it is necessary that the form of the slip having blank columns to input and output data is defined and formed on the display screen of the foregoing office apparatus.

In general, there have been known two methods for forming such, one being a batch method whereby such image a form is formed by giving conditions by parameters from the outside and the other being a painting method whereby such a form is formed while interacting with the display screen. The above methods use a method whereby the operator executes a column interaction while looking at a picture plane to be formed and the form of the document of an original and draws data column-by-column on the display.

Ordinarily, in the business affairs of the user, the screen in concerned with the input and a form document such as a slip or the like is concerned with the output. In the present situation, to form such a screen or document as data to be processed by a computer, the format of the document drawn on paper is converted in column units on the display and drawn on the display screen.

However, when converting from the data on paper into data on the display screen, calculations for a position matching are not easy, column counting errors frequently occur and many man-hours are needed, requiring a long working time.

Therefore, as disclosed in prior U.S. application Ser. No. 07/550,521 of the same assignee, there is described a method whereby a format is read out from a recording medium such as a sheet or the like on which a format of a document has been written and a program is automatically formed from the content of the format. However, according to the above method, the format cannot be completely recognized due to various characteristics of the sheet of the document and printing color of the sheet of the document or conditions of a dirt, dust, or the like, resulting in an erroneous recognition, and confirming and correcting works for such an erroneous recognition on the screen are necessary. Consumption of time for the confirming and correcting works on the screen results in a decrease in value of the above automatic forming method in spite of the fact that the working efficiency was improved by reading the format from the sheet.

In the confirming and correcting works, terms or words on the slip are generally frequently written by small characters. If the format is displayed on the screen by the size as written, the characters are hard to read and it is difficult to correct.

Among documents to be read, there are many documents which are so large that the whole document cannot be displayed on the screen. In many cases, it is impossible for the operator to correct such a document while seeing all of it.

In the correction of a position or an interval between characters as well, when correcting on a unit basis of 1/10 mm, according to a method such as a painting method whereby a correcting position is directly indicated on the screen, errors frequently occur and there is a case where a recognizing process after correction as a next step is not correctly performed due to the errors.

Further, with respect to the correction of a ruled line, there is a case where the ruled line is not correctly read depending on the print color or the shade or depth of the print color. In such a case, it is necessary that the ruled line can be easily corrected.

Moreover, a form document has many blank columns among the rows and columns. If the form document is drawn as it is on the display, in many cases, the form document overflows the display screen If the document processing work is executed with the form document overflowed, a scroll of the screen occurs during the execution of the document processing work and a desirable influence is exerted on the document processing work executing performance. Therefore, it is necessary to display the form document on the area within the display screen as much as possible. The operator has formed the form document while considering all of the adjustments.

As mentioned above, it takes an extremely long time for the format forming works of the user.

SUMMARY OF THE INVENTION

It is an object of the invention to solve the problems as mentioned above and to provide a method and system for forming a form document which can provide simpler operations with respect to the confirming and correcting works of a display document by the operator, thereby making the most of the effect of the foregoing automatic forming method.

Another object of the invention is to provide a method and system for automatically forming a document format to be displayed on a screen in which the format forming work of the office work executing person is reduced and the efficiency of performing his or her work is improved, reducing an amount of business affairs.

To accomplish the above objects, there is provided a document processing system comprising a sheet or other recording medium on which a format of a document has been recorded; a reading apparatus to read the document format recorded on the recording medium; and a display device to display the document format which was read. This system has a feature such that a production of a document format, which is one of various document processings, is executed in the following manner. That is, the data describing the format is read out from the recording medium in which the format of the document has been described. The data which was read is displayed on the screen by a format which is the same as or similar to the format recorded on the recording medium so as to permit the operator to easily correct and update the format displayed on the screen while confirming it on the screen. An input/output area is produced by recognizing the confirmed format and is overlaid on the format displayed on the screen and is displayed, thereby enabling the displayed input/output area to be corrected while allowing the operator to confirm it on the screen.

Preferably, the data which was read by the reading apparatus is calculated on the basis of a ratio between the size of the minimum reading unit of the reading apparatus and the size of the minimum unit of the screen display and is displayed on the screen in a similar format.

In a preferred embodiment, in the case of executing an editing operation such as a correction or the like on a character or character train, it is sufficient to merely designate a portion near the character or character train to be edited by using a cursor or the like. In such a case, the character which is closest to the designated coordinates is selected and recognized as a designated character.

According to a further preferred embodiment, when a portion on the document format displayed on the screen is designated by the operator, detailed data of the designated portion is displayed at a position which is not overlaid onto the designated portion. By changing the content of the displayed detailed data, the content of the designated portion is replaced by the content according to the detailed data of the changed content.

On the other hand, in a preferred embodiment, upon formation of a plurality of ruled lines, by designating a start position of the ruled lines, an end position of the last ruled line, the number of ruled lines, and a vertical or lateral direction, an interval between the ruled lines is calculated from differences between the coordinates of the start and end positions and the number of ruled lines and the ruled lines are drawn at the calculated intervals.

In the case of designating a character to be corrected, by designating a portion near the character to be designated, a desired character can be designated more quickly by selecting the character near the coordinates of the designated position on the basis of such coordinates or by automatically selecting one character in accordance with a predetermined priority if there are a plurality of characters.

Further, in the case of confirming the details of a character to be corrected or a blank area (input/output area), detailed data is displayed so as not to be overlaid to the designated portion. Therefore, the details can be confirmed by seeing another portion of screen while seeing the character to be corrected or the input/output area. The relation between a portion preceding/succeeding the character to be corrected or the input/output area can be easily observed. If the values on the screen are changed, the data of the original screen or the attributes and position of the input/output area are automatically changed, making it possible to efficiently successively confirm and correct.

In the case of adding characters, in many cases, a character train comprising a plurality of characters is added instead of one character. However, even in such a case, a process such that characters are added one by one while designating the positions on the screen is not executed. Instead, a portion to which a character train is desired to be added is designated to display the detailed data and a character train is input onto the detailed screen, thereby enabling the character train to be added onto the screen. Thus, characters can be accurately efficiently added.

Further, in the case of correcting the ruled lines which could not be recognized, particularly, upon correction of a specification section, the number of ruled lines is large and it is troublesome to correct. However, by merely designating the start and end positions of the ruled lines to be formed, the number of ruled lines which are to be drawn between the start and end positions, and the lateral or vertical lines, the ruled lines can be formed by a predetermined operation independently of the number of ruled lines.

To accomplish the above object, the invention has another feature such that in a document processing method for processing a document, data describing a format is read out from a recording medium on which a format of a document has been written, a character size per character of a display is determined from the data which was read, cells are arranged and disposed on the basis of the decided character size, data regarding portions outside cells hereinafter abbreviated as "extra-cell data") such as character, numerical value data or the like is arranged on the basis of the arranged cells, the cells and the extracell data are compressed so as not to overflow the display screen, and a processing procedure of the items of the format displayed on the display screen is decided. "Cell" is defined by a square frame which is defined by four ruled lines.

"Compression" preferably includes at least one of the deletion of the blank rows and blank columns, the synonym conversion of the character train using the data base, and the conversion from a full-sized character into a half-sized character.

"Determination of the processing procedure" preferably indicates that a character train of each item is recognized by matching with the data base.

It is also possible to make a format similar to a format of a document by obtaining a reference character size from the document and by obtaining row and digit positions on the display by utilizing the reference size from the position of a ruled line or a character which was expressed on a unit basis of 1/10 mm.

First, the portion surrounded by the ruled lines is converted into the matrix expression and is arranged. After that, the character train which is not surrounded by the ruled lines is arranged with reference to a table which describes the arrangement of the portion surrounded by the ruled lines. Therefore, the cells and the extra-cell data can be arranged at substantially the same positions as the relative positions between the cell and the extra-cell data on the document without causing an expansion and compression of the arrangement due to sizes of characters on the document, which prevents formation of such a format that gives the operator an impression that the formed format is different from the actual one.

By compressing a character train by synonym conversion using the data base, the character train can be efficiently accomodated in the display screen. Further, by selecting the item to be processed first and deciding the processing order with reference to the format which was read, the operator's work can be efficiently executed.

Applications relating to the present invention will now be shown below.

1. Japanese Patent Application No. 59-180517 filed on Aug. 31, 1984) and U.S. patent application Ser. No. 766943 (filed on Aug. 19, 1985) which uses the above Japanese Patent Application as a basic application, U.S. patent application Ser. No. 178768 (filed on Mar. 29, 1988) which is a Continuation Application of the above U.S. patent application, U.S. patent application Ser. No. 399411 (filed on Aug. 25, 1989) which is a Continuation Application of the above U.S. patent application Ser. No. 178768, and U.S. patent application No. 485986 (filed on Feb. 27, 1990) which is Continuation Application of the above U.S. patent application Ser. No. 399411.

2. Japanese Patent Application No. 63-209975 (filed on Aug. 24, 1988) and U.S. patent application Ser. No. 397117 (filed on Aug. 21, 1989), the priority of which is claimed from the above Japanese Patent Application No. 63-209975.

3. U.S. patent application Ser. No. 07/550,521, the priority of which is claimed based on Japanese Patent Application No. 1-1246290 (filed on Sep. 25, 1989) and No. 1-175469 (filed on Jul. 10, 1989) and Japanese Patent Application No. 1-202794 (filed on Aug. 7, 1989).

BRIEF DESCRIPTION OF THE DRAWINGS

FIG. 23 is a flowchart showing processing contents of pre-processings according to an embodiment of the invention;

FIG. 24 is a diagram for explaining a construction of a reference character size when cells, extra-cell data, and the like are arranged according to another embodiment of the invention;

FIG. 25 is a diagram for explaining a method of extracting an enlarged character according to another embodiment of the invention;

FIG. 30 is a diagram for explaining a method of arranging an extra-cell character train according to another embodiment of the invention;

FIG. 31 is a flowchart for post-processings according to another embodiment of the invention;

FIG. 33 is a diagram for explaining the outline of a synonym converting method according to another embodiment of the invention;

FIG. 34 is a diagram showing an outline of a half-sized character converting method according to another embodiment of the invention.

BEST MODE FOR CARRYING OUT THE INVENTION

Preferred embodiments of the invention will be described in detail hereinbelow by using the drawings.

Figure 1:
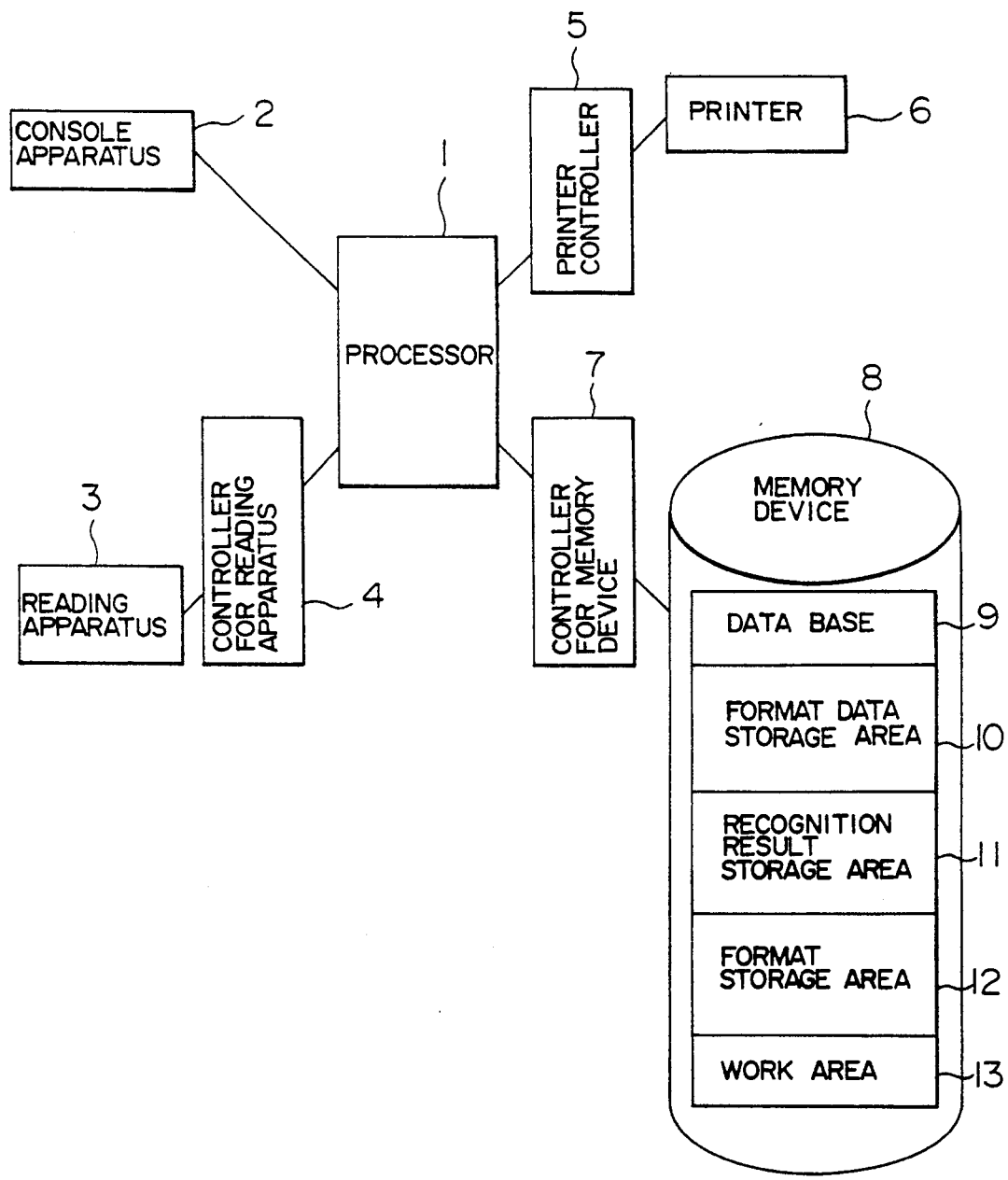
FIG. 1 is a block diagram showing a whole construction of a document processing system of an embodiment of the invention.

FIG. 1 is a diagram of the construction of a document processing system according to an embodiment of the invention. A console apparatus 2 having a keyboard and a mouse (if necessary) which are used for an operator to input commands, a screen to display a formed format, and the like, and a reading apparatus 3 to read slips and documents are connected to a central processor 1 to control the entire system through a controller 4 for the reading apparatus. A printer 6 to output a processed document is connected to the processor 1 through a printer controller 5. A memory device 8 to store the formed format or the like is connected to the processor 1 through a controller 7 for the memory device. A document can be also read as mentioned above by using an image reader such as an OCR or the like as a reading apparatus. Data of a document can be also directly input by using a word processor as a reading apparatus 3. Or, document data stored on a floppy disk of a word processor can be also read by using a magnetic disk apparatus as a reading apparatus 3. Further, a facsimile apparatus or the like can be also used as a reading apparatus 3.

The processor 1 reads a document from the reading apparatus 3 and stores format data or input data which has been read into a format data storage area 10 in the memory device 8. The document is displayed on the screen by a format similar to that of the read document, thereby enabling the operator to easily perform the confirming and correcting operations of the document on the screen. After completion of the correcting operation, the processor 1 stores the data of the corrected portion into the format data storage area 10. On the basis of the stored format data, the processor 1 recognizes the format of the document and the meanings, contents, and the like of the items or words which are used in the document by using a data base 9 in the memory device 8. The result of the recognition is stored into a recognition result storage area 11 and a screen displaying format is automatically formed by the processor 1 on the basis of the recognition result. Such a format is obtained by correcting the above format of a similar type by the processor 1 into such a form that allows the operator to easily execute the input and output operations of the data into/from input/output fields of the document. The processor 1 sets a processing procedure from the format which has been formed and stored in a format storage area 12 and executes a business affair program. In the case of a slip as an example, the processing procedure denotes the flow of processes such that an amount of money is obtained by a process of unit price x quantity. A work area 13 is an area in the memory device 8 which temporarily stores a group of tables which are produced during the operation of the processor 1, the tables being necessary when a pop-up screen, which will be explained hereinlater, is displayed on the screen or the like.

Figure 2:
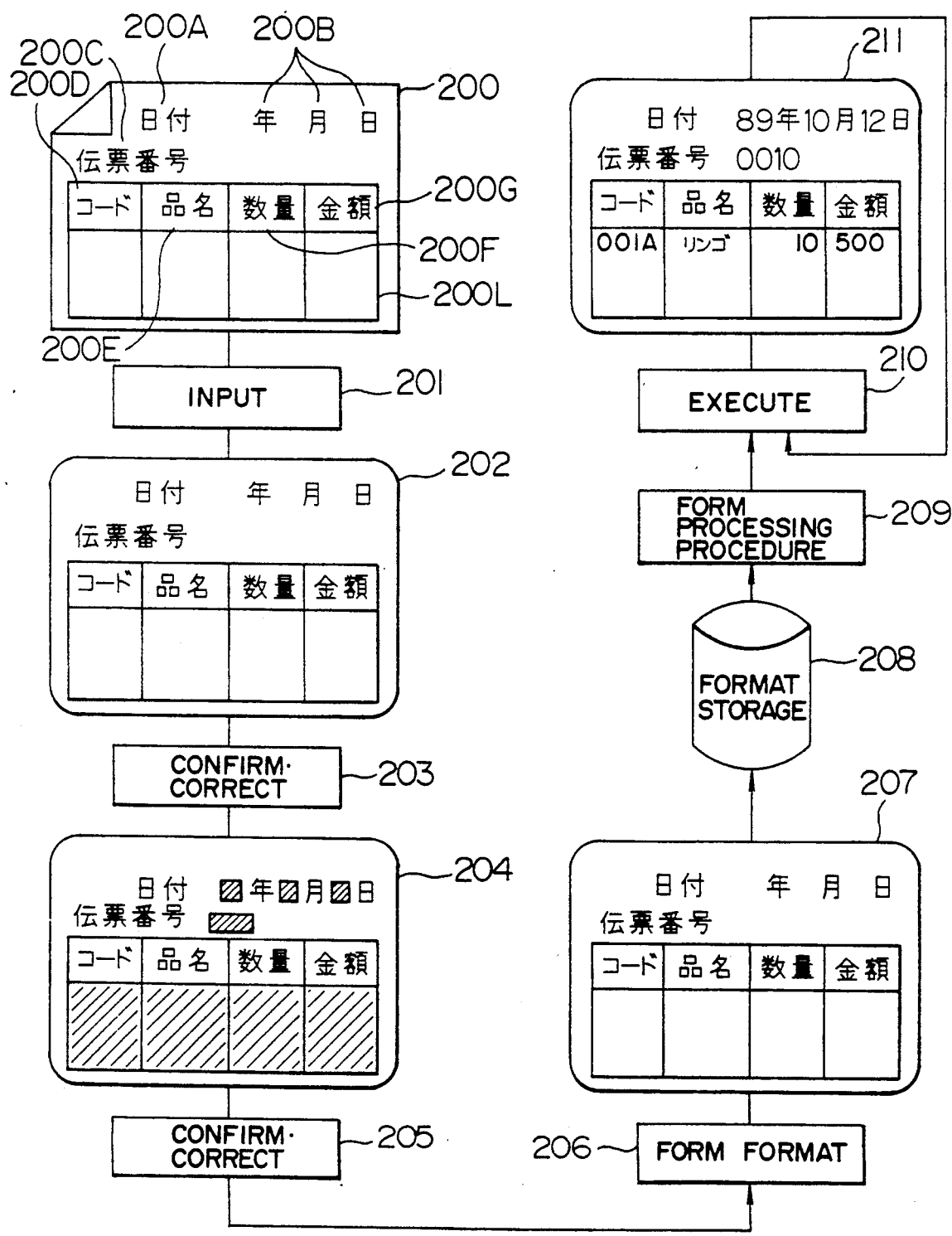
FIG. 2 is a diagram showing an operating procedure of the operator, a change in state of the screen in the system of the invention, and the operation of the system of the invention.

FIG. 2 is a flowchart for explaining the flow of a series of processes according to an embodiment of the invention.

In the diagram reference numeral 200 denotes a slip as an example of a document on which a date 200A, "year, month, day" 200B, a slip number 200C, a code 200D, an article name 200E, a quantity 200F, an amount of money 200G, and ruled lines 200L have been written. The slip 200 corresponds to a sheet of an original Even if there is an inconvenience such as a slight dirt, unclearness of characters or ruled lines, or the like, according to the invention, the operator can easily correct the problem while observing the display of the original on the screen and can produce and display an accurate slip of a desired format on the screen.

FIG. 2 explains the flow of a series of processes upon execution according to an embodiment of the invention. The document sheet on which a format as shown by 200 has been written is read from the reading apparatus 3 such as an OCR or the like and the format data is input (201). On the basis of the format data such as ruled lines, characters, images, and the like which have been read, an image of a pattern similar to the pattern of the slip of the original is displayed on the display screen of the console apparatus 2 (202). As mentioned above, the format data can be also directly input from an apparatus such as word processor, facsimile apparatus, or the like.

The operator can confirm and correct the display content (203). On the basis of the pattern of the ruled lines or the meanings of the terms which are included in the read format data or by using the input data or the like from the operator, the computer recognizes the input/output fields and displays the recognized input/output fields onto the screen on which the data such as ruled lines, characters, images, and the like have already been displayed (204).

Further, here it is also possible to perform confirmation and correction at the above stage (205). After completion of the confirmation and correction, a format which will be processed from here on is automatically produced on the basis of the read format data or the recognized input/output fields (206). The result of the format produced is displayed on the display screen (207), so that the operator can confirm and correct the displayed result. The produced format is stored into the format storage area 12 in the memory device 8 (208). On the basis of the data of the produced format or the like, a processing procedure is formed (209), the processing procedure is executed (210), and the result of the execution is displayed (211).

Figure 3:
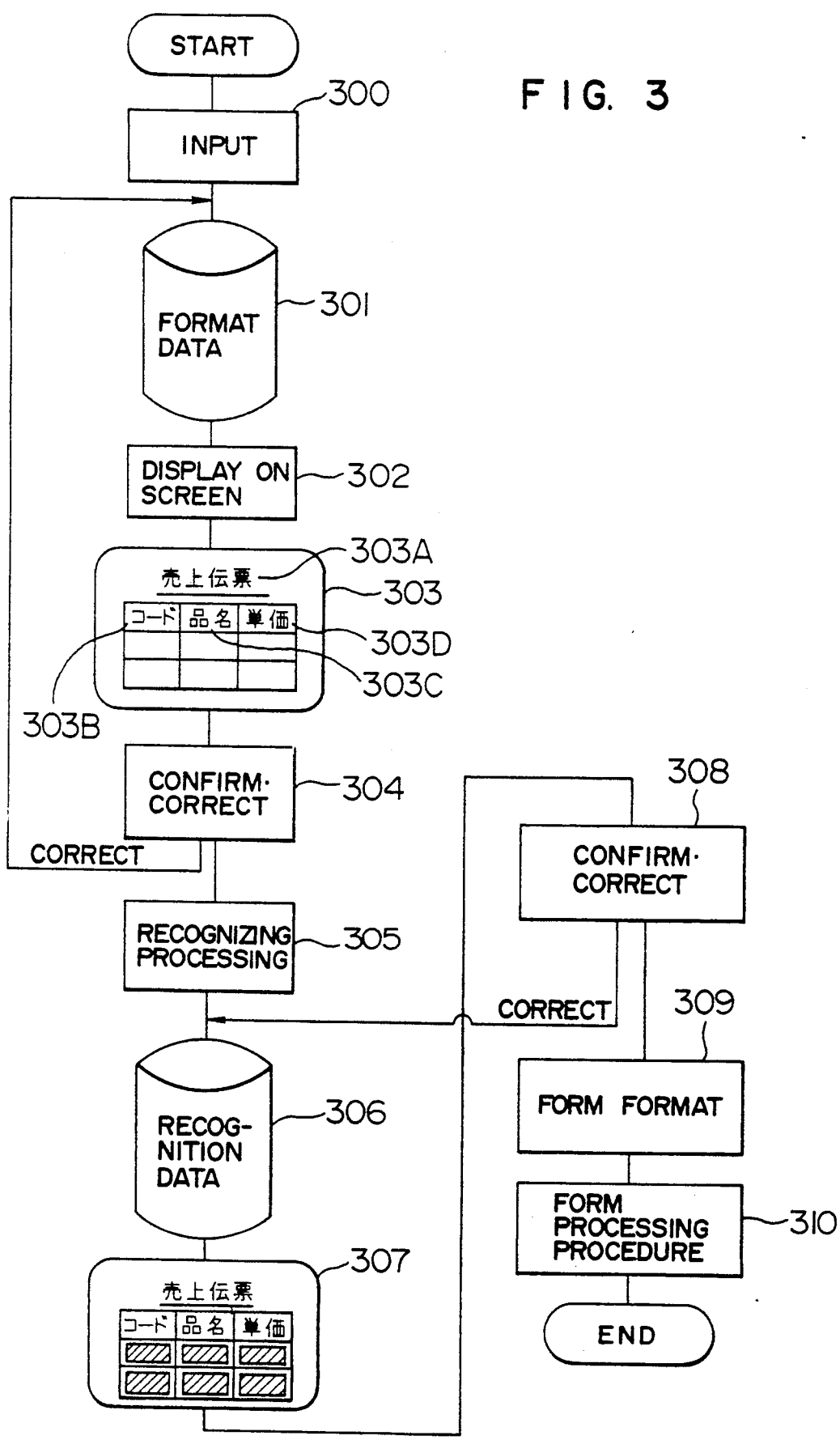
FIG. 3 is a diagram for explaining the flow of a detailed document processing of another embodiment of the invention.

FIG. 3 is a diagram for explaining the flow of the series of processes in FIG. 2 further in detail.

A format of a document to be processed is first input (300). For instance, the document can be read by an image reader or the document formed by a word processor can be directly read or a floppy disk in which such a document has been recorded can be read. As a result of the reading, the data of the characters, the data of the ruled lines, and the data of the paper size and the like of the read document are stored as format data into the format data storage area 20 of the memory device 8 (301). That is, the read format data is stored into the format data storage area 10 as it is in step 301. On the basis of the format data, the processor 1 forms a format similar to the format of the read document and displays the document onto the screen (302). An image as shown by 303 is displayed. A sales slip 303A having columns of names such as code 303B, article name 303C, and unit price 303D is shown on the screen 303. The document format displayed on the screen is confirmed and corrected by the operator (304). After completion of the confirmation, the processing routine advances to a recognizing process of the format data stored in the format data storage area 10 (305). The processor 1 forms input/output fields from the meanings of the character train (terms) and the pattern of the ruled lines by using the data base 9 and stores the recognition data into the recognition result storage area 11 in the memory device 8 (306). The formed input/output fields are displayed on the screen on which the ruled lines and characters have already been displayed (307). The operator confirms and corrects the input/output fields (308). After completion of the confirmation, the processor 1 forms a format from the recognition data in the recognition result storage area 11 (309). The processor 1 stores the formed format into the format storage area 12 in the memory device 8 and performs a processing procedure (310).

Figure 4:
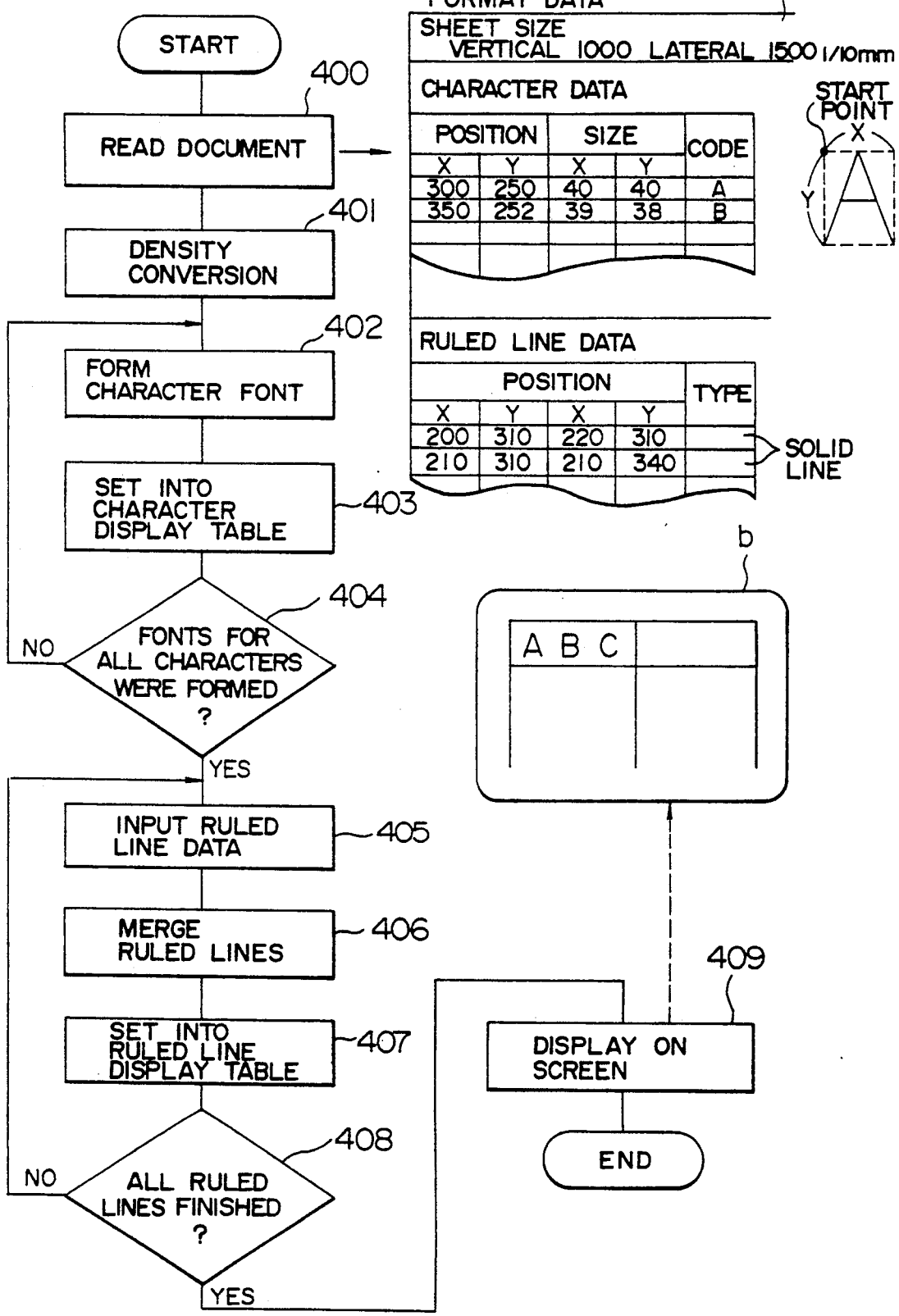
FIG. 4 is a flowchart showing a processing of displaying a format on a screen according to another embodiment of the invention.

FIG. 4 is a flowchart showing the flow from the reading of a slip or a document to the display on the screen. A document to be processed from here on is read (400). The sheet size and the data of characters and ruled lines are stored into a format data file as shown by a. All of the format data is expressed on a unit basis of 1/10 mm. The format data comprises the character data and the ruled line data. The character data comprises: X and Y coordinates of a position of a character of interest with respect to a reference position which is a certain point at the left upper corner on the screen; lengths in the X and Y directions of a quadrangle which circumscribes the character, setting the left upper corner of the quadrangle as a start point; and a code representative of the character. The ruled line data comprises: coordinates of the head point and the end point of the ruled lines; and the kinds indicating whether the ruled line is a solid line, a broken line, or the like. The processor 1 executes a density conversion for display on the screen on the basis of the read format data (401). Although the density conversion will be explained hereinlater, such a conversion is a processing to display the read document on the screen in a similar form. A display character font to display on the screen is formed by reducing or enlarging a preset standard character font in accordance with the character size data in the format data (402). A reduction or enlargement ratio is set into a character display table (403). Fonts of all of the characters are formed. Subsequently, a merging process of a ruled line having the same kind of data is performed from the ruled data in the format data (406) and the resultant data is set into a ruled line display table (407). The merging processing of the ruled line will be explained hereinlater. A format which is the same as or similar to a format of the read document is displayed on the screen on the basis of the set content of the character display table and the set content of the ruled line display table (409).

Figure 5:
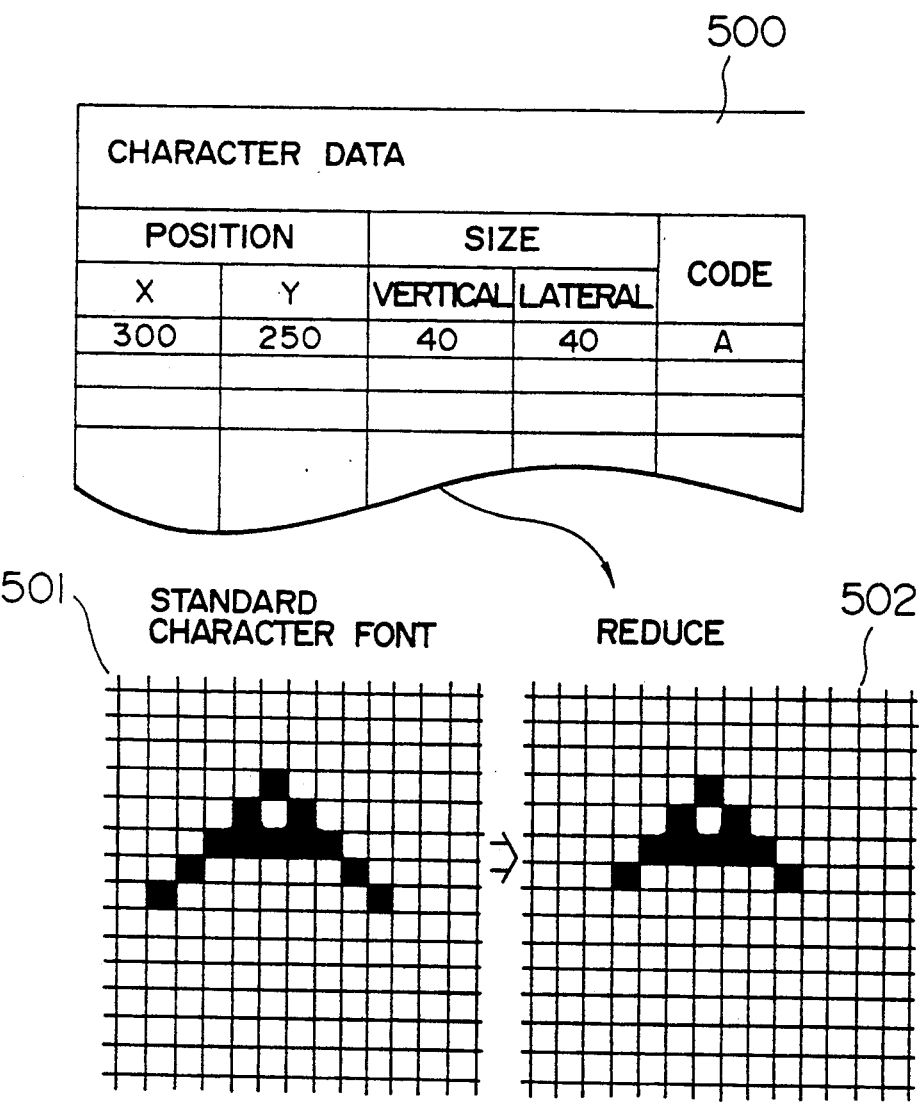
FIG. 5 is a diagram for explaining a method for a density conversion according to another embodiment of the invention.

FIG. 5 is a diagram which explains a density converting method. Groups of black dots as shown in reference numeral 501 are provided as standard character fonts for all of the characters. A display character font is formed by enlarging or reducing a group of black dots, i.e., a standard character font, in accordance with size data of character data 500 in the format data. Practically speaking, the enlargement or reduction is executed on the basis of a ratio between the size of the minimum unit for reading by the reading apparatus 3 and the size of the minimum unit of the screen display. Reference numeral 502 indicates an example in the case where the standard character font has been reduced in accordance with the format data.

Figure 6:
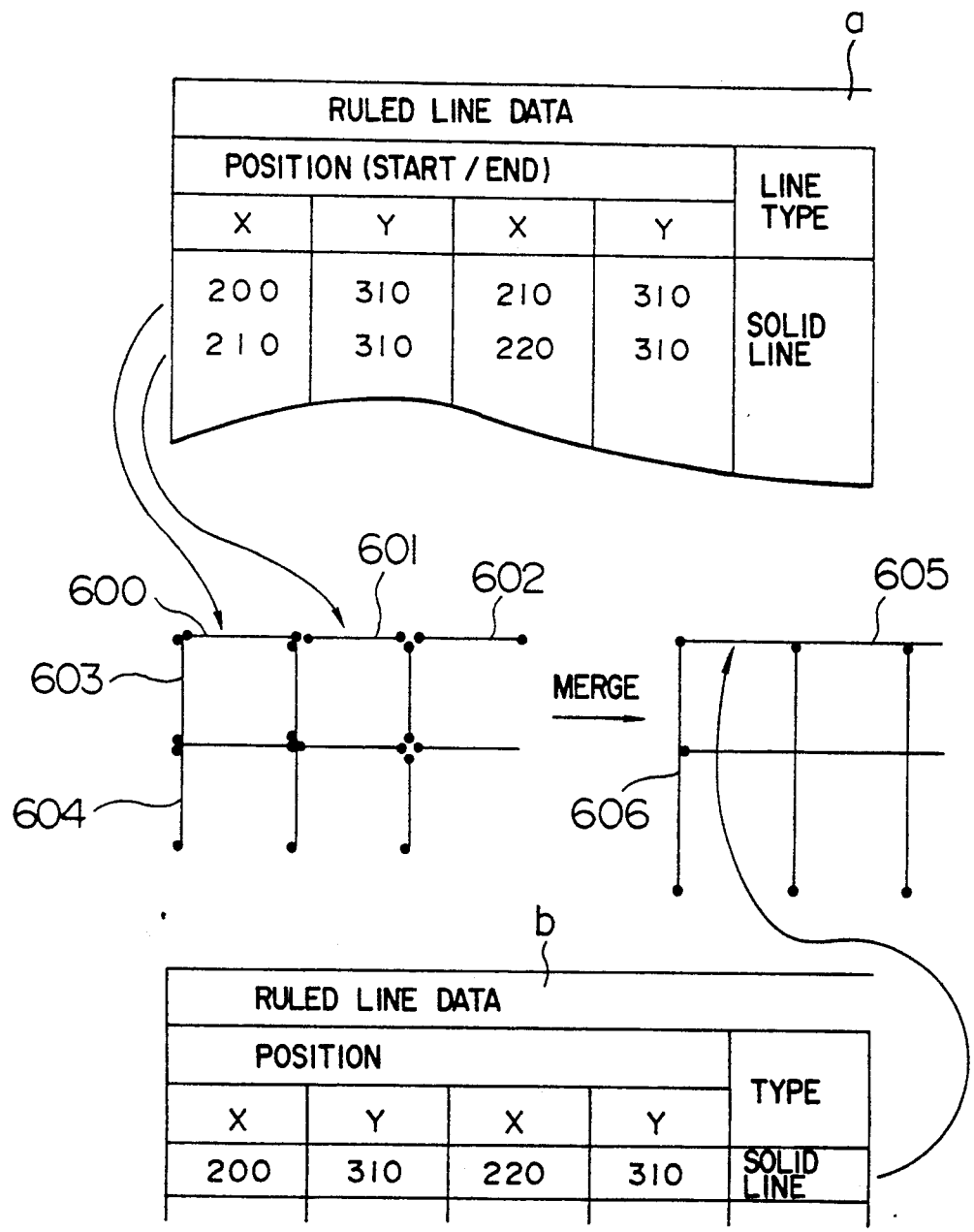
FIG. 6 is a diagram for explaining a processing method for a merging of ruled lines according to another embodiment of the invention.

FIG. 6 is a diagram which explains a processing method of merging a ruled line. In the ruled data, there is a case where a ruled line which is actually one line segment is recognized as line segments divided at intersection points such as (600, 601, 602) or (603, 604). By coupling the same kind of ruled lines as indicated by reference numeral 605 or 606 shown by b and merging and forming one line, an amount of ruled line data to be set into the ruled line display table can be reduced.

Figure 7:
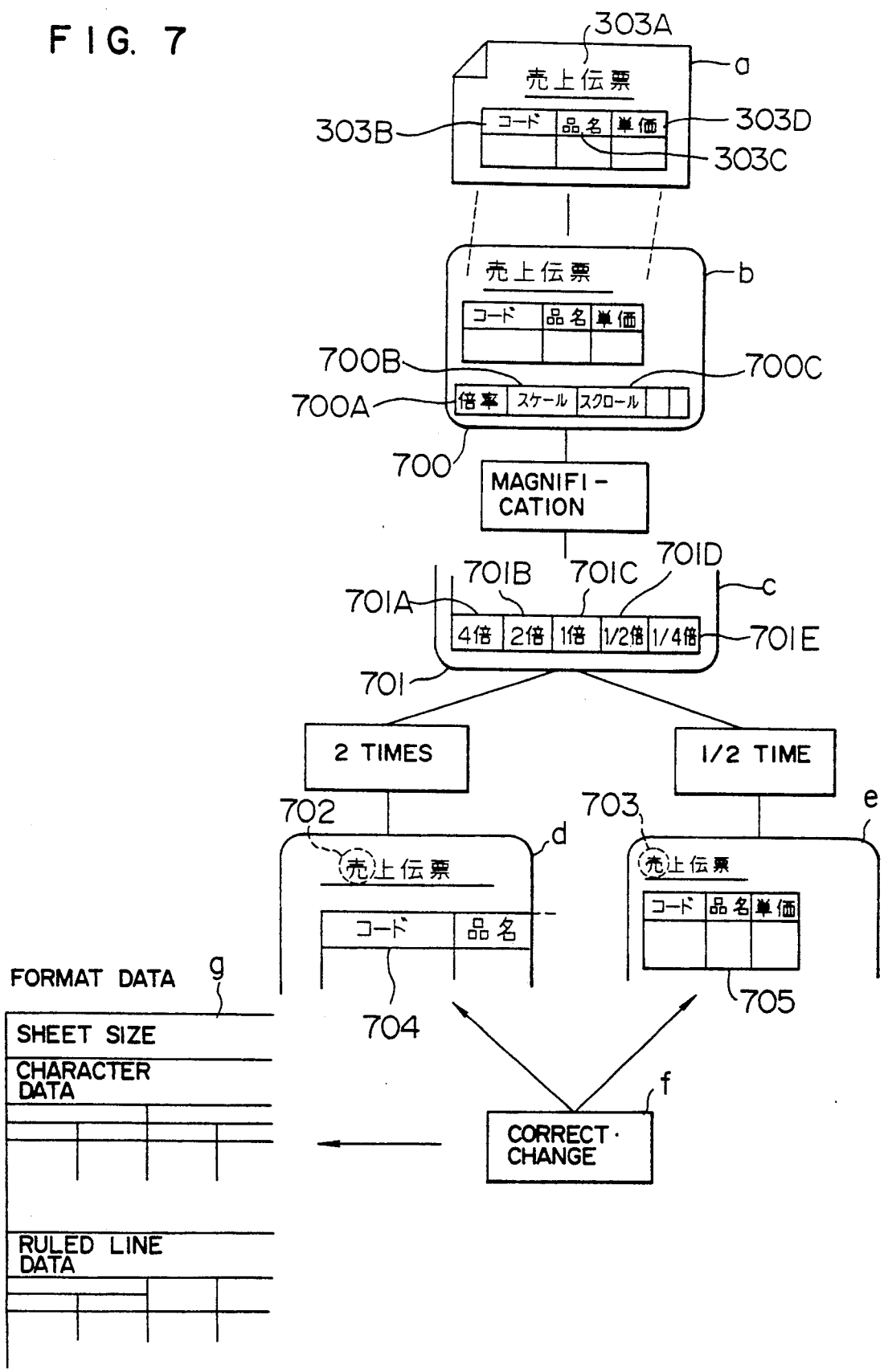
FIG. 7 is a diagram for explaining an enlargement and a reduction of a screen display according to another embodiment of the invention.

FIG. 7 is a diagram explaining an enlargement and a reduction of a screen display. A slip shown by a is input and is displayed on the screen by an actual size as shown by b. An optional guidance 700 is displayed in the lower portion of the displayed screen. The operator selects a desired item in the guidance and executes the corresponding processing. For example, the guidance 700 includes a magnification 700A, a scale 700B, a scroll 700C, and the like. When a key of the magnification 700A is selected and input from the optional guidance, a next guidance 701 as shown by c is displayed on the screen. The guidance 701 includes four times 701A, two times 701B, one time 701C, ½ time 701D, and ¼ time 701E. For instance, when the magnification of two times 701B is selected, the image is enlarged by two times and is displayed as shown by d. In such a display, the characters are enlarged by two times as shown by reference numeral 702 and the ruled lines forming a table are also extended by two times as shown by reference numeral 704. In the case where the magnification of ½ time 701D is selected in the screen on which the guidance c has been displayed, an image as shown by e is displayed. As shown by reference numeral 703, the characters are reduced by ½ time and the entire ruled lines forming a table are also reduced by ½ time as shown by reference numeral 705. The results of the enlargement and reduction are reflected to the format data as shown by g. The operator can correct or modify the content while observing the displayed image on the screen which has been reduced or enlarged. If the format of the read slip or document is too small to be seen on the screen, the format is enlarged. If the format is too large to be fully displayed on the screen, the format is reduced. In this manner, the correcting processing can be executed while checking the whole image. Such enlargement or reduction is realized by a method similar to the case of the character font in FIG. 5.

Figure 8:
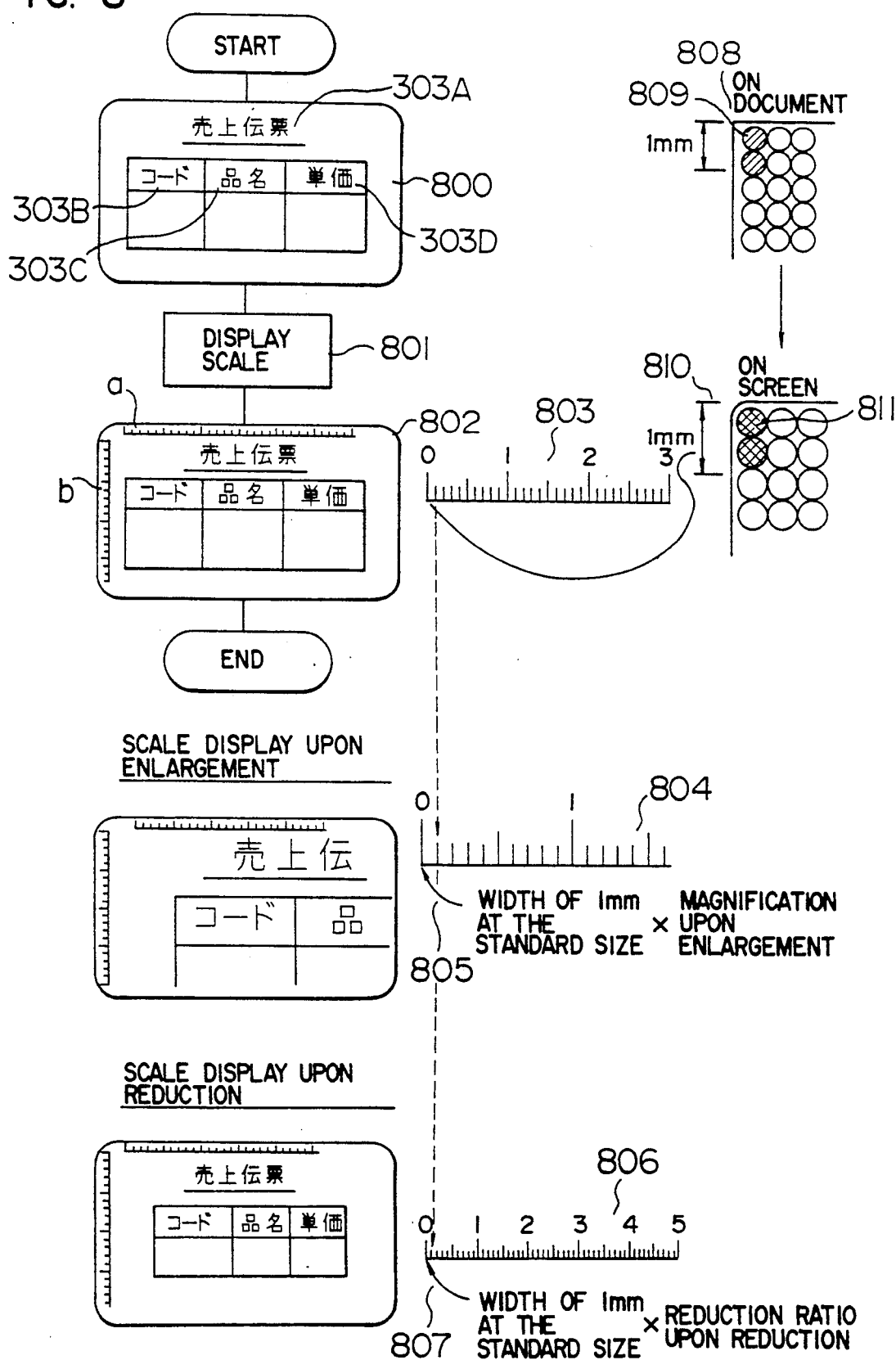
FIG. 8 is a diagram for explaining a scale display according to another embodiment of the invention.

FIG. 8 is a diagram explaining a scale display. In conjunction with the capability of enlarging/reducing the display on the screen, a scale is displayed and graduations of the scale which is displayed are also automatically adjusted in accordance with the size of display screen. Thus, the confirmation and correction of a character position and the confirmation and correction of an interval between characters can be easily performed.

In FIG. 8, in a screen 800 on which a format has been displayed, when a scale display key is input (801), a lateral scale a and a vertical scale b are displayed as shown in a screen 802. The scale is displayed on a 1 mm unit basis as shown by reference numeral 803. As a width which is displayed as 1 mm, the number of dots constituting 1 mm on the document read is calculated, one dot being a minimum unit of display on the screen. (The number of dots) x (the size of dot which is a minimum unit of display on the screen) is set to 1 mm on the screen. Take FIG. 8 for example, on a document 808, 1 mm is constructed by two dots 809 as a minimum unit. On a screen 810, a unit of 1 mm as a scale width is constructed by two dots 811 on the screen. In the scale display upon enlargement, a scale 804 in which the width of 1 mm on the screen x the magnification upon enlargement is considered as a width of 1 mm is displayed as shown by reference numeral 805. On the other hand, as a scale display upon reduction, a scale 806 in which the width of 1 mm on the screen x the reduction ratio upon reduction is considered to be a width of 1 mm is displayed as shown by reference numeral 807.

Figure 9A:
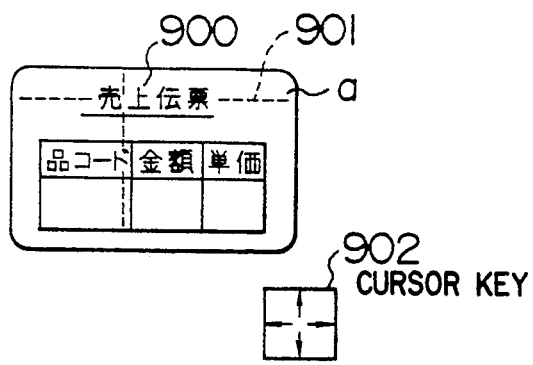
FIGS. 9A to 9C are diagrams for explaining a method of selecting a designated character according to another embodiment of the invention.
Figure 9B:
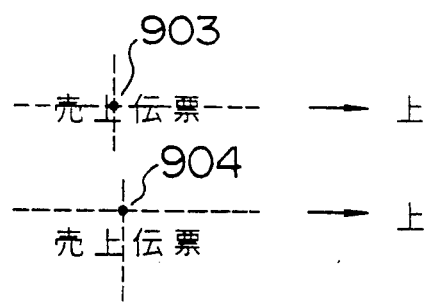
Figure 9C:
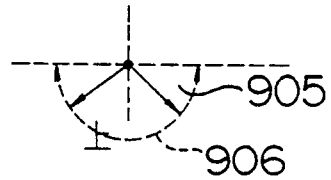

FIGS. 9A to 9C are diagrams explaining a method of selecting a designated character. A character to be corrected on the screen shown by a in FIG. 9A is designated by an intersection point of a vertical cursor 900 and a lateral cursor 901. The cursors are operated by a cursor key as shown by reference numeral 902. On the other hand, in order to enable easy designation of a small figure on the screen as well, a small figure can be automatically selected and designated by merely positioning the cursors to a portion near a character to be designated as shown by reference numeral 904 in FIG. 9B. It is also possible to use a method of positioning by, for instance, detecting a character having coordinates within a semicircle of a predetermined radius from the position of the cursor as a relevant character as shown by reference numeral 905 in FIG. 9C.

When the character to be corrected is designated, detailed data of the character to be corrected is displayed at a position where it doesn't overlap such a character as will be explained hereinlater. By executing the correction of the displayed content, the designated character on the format is automatically corrected. Thus, it is possible to correct the displayed content while observing the original screen. A detailed screen displayed on the screen is called a pop-up picture. The pop-up picture is extracted from the format data storage area by the processor 1 and is displayed on the screen on the basis of the data which has temporarily formed as a table form in the work area 13.

Figure 10:
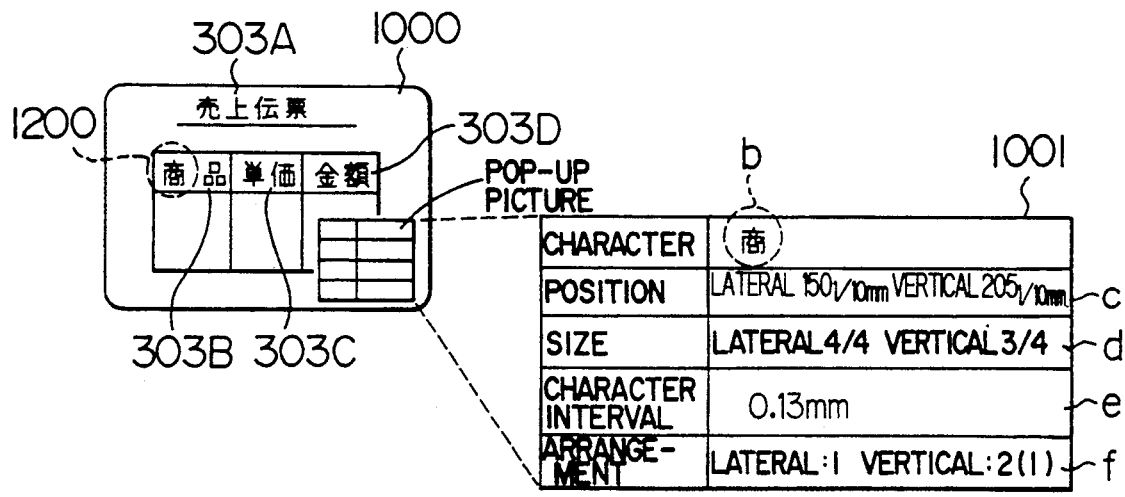
FIG. 10 is a diagram showing an example of a pop-up screen according to another embodiment of the invention.

FIG. 10 is a diagram explaining an example of the pop-up picture. When a character a is designated on a screen 1000, a pop-up picture 1001 is displayed at a position where it doesn't overlap the designated character, in this case, at the right corner. The content of the pop-up picture includes a content b of the character, a position c of the character, a character size d, an interval e between the character of interest and the next character, and an arranging direction f of the character train.

The position c of the character is displayed by, for instance, lateral 150 1/10 mm and vertical 205 1/10 mm. The size d is a size for the standard character font and is displayed by, for example, lateral 4/4 and vertical ⅔. The character interval e is displayed by, for instance, 0.13 mm. For the arrangement, a character train arranged in the lateral direction is expressed by 1 and a character train arranged in the vertical direction is expressed by 2. It is shown by (1) that the character train including a character b is laterally arranged.

Figure 11:
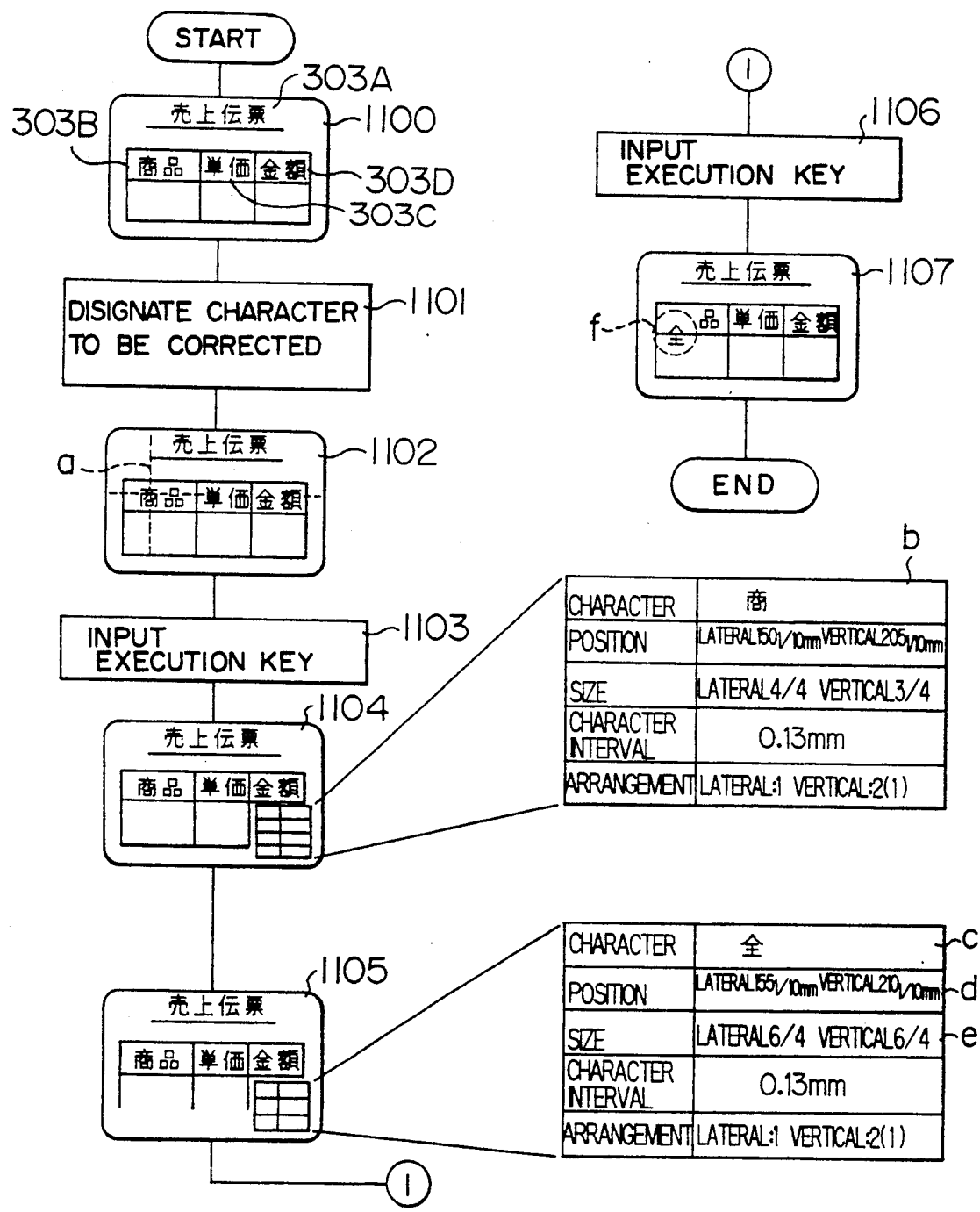
FIG. 11 is a diagram for explaining a flow of a character correction according to another embodiment of the invention.

FIG. 11 is a diagram explaining the flow of a character correction.

First, a format of the document is displayed on the screen (1100). The operator designates a correction character (1101) and positions the cursors to a portion near the correction character (1102). When an execution key is depressed by the operator, the pop-up picture b is displayed at the right corner of the screen (1104). The operator modifies the detailed data in the pop-up picture (1105). The operator changes, for example, the content of a character column shown in b to the content as shown in c and, further, also changes the position d and size e of the character. When the execution key is subsequently depressed (1106), a character f which has already been designated in the display screen is replaced by the content based on the modified detailed data in the pop-up picture and is displayed (1107).

Figure 12:
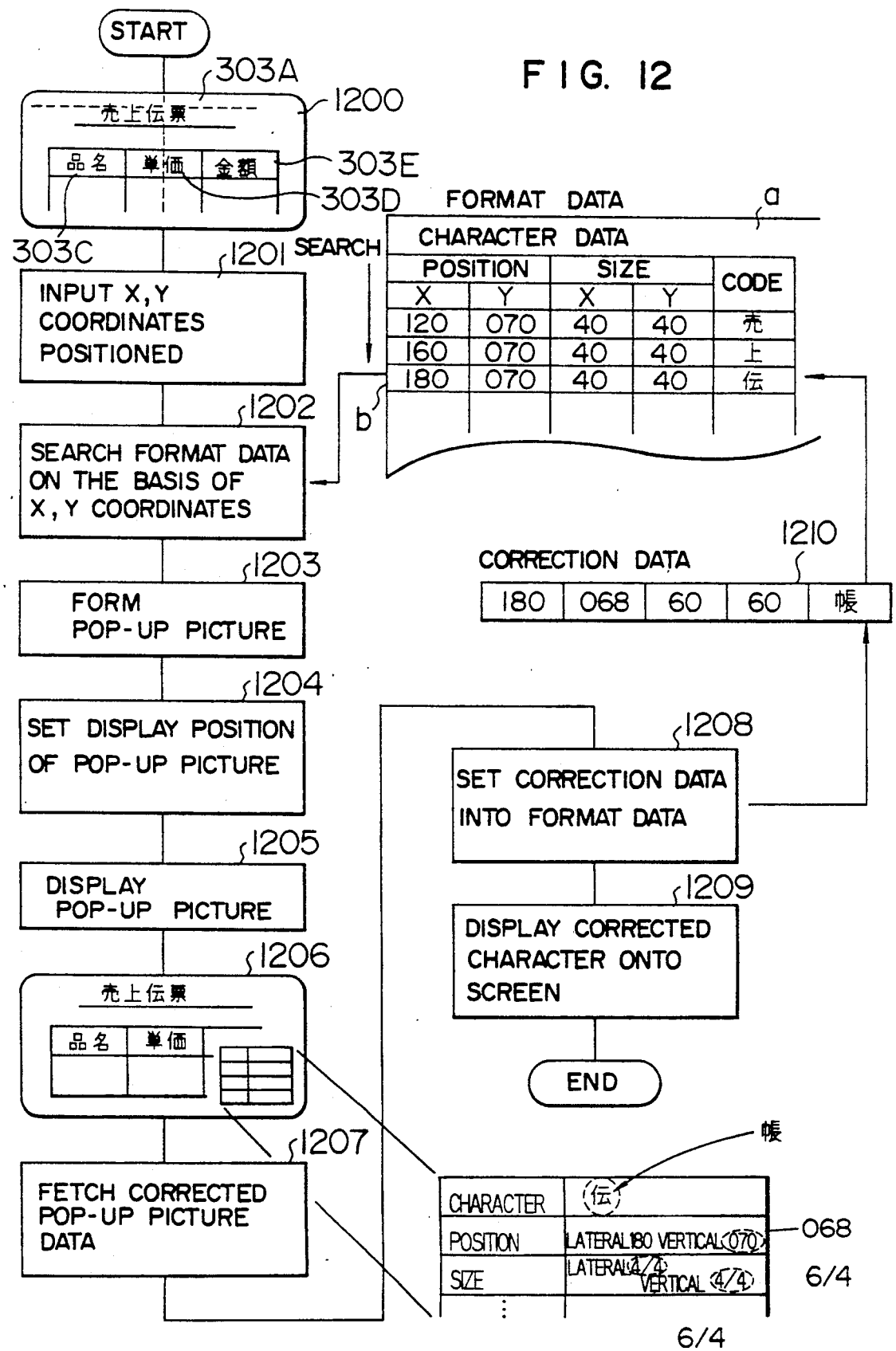
FIG. 12 is a flowchart showing a flow of a character correction according to another embodiment of the invention.

FIG. 12 is a flowchart showing the above flow. In the figure, reference numeral 303E denotes an amount of money. When the cursors are positioned near a character to be corrected on the screen (1200), the X and Y coordinates of the point of the positioned cursors are derived (1201). The character data a in the format data is retrieved on the basis of the above coordinates and the character data b which is closest to the positioned point is read out (1202). A pop-up picture is formed on the basis of the readout data (1203). A display position of the pop-up picture is set (1204). The pop-up picture is displayed at the set position (1205). The operator confirms the content and corrects it. The detailed data (correction data) on the pop-up picture which has been corrected is fetched (1207). The fetched detailed data (correction data) 1210 is written into the format data (1208). After that, the corrected character is replaced by the designated character on the screen on the basis of such detailed data and is displayed (1209).

Figure 13A:
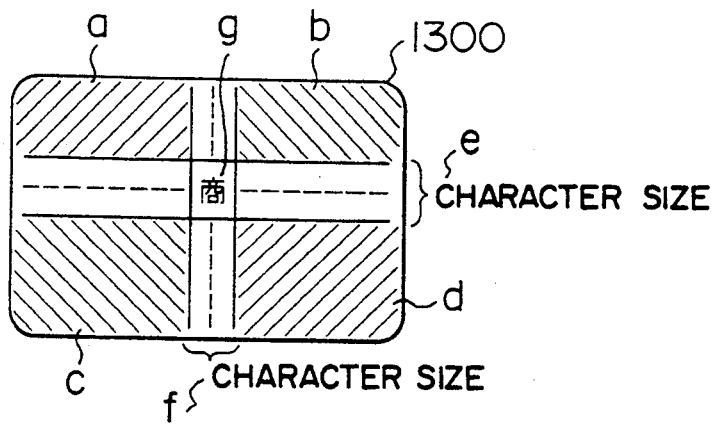
FIGS. 13A and 13B are diagrams for explaining a method of deciding a pop-up screen display according to another embodiment of the invention.
Figure 13B:
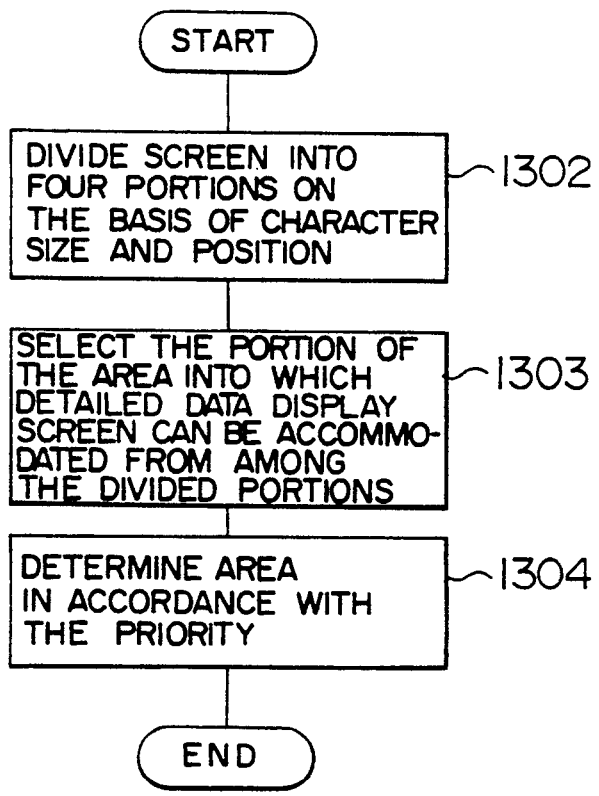

FIGS. 13A and 13B are diagrams explaining a method of deciding a display position of a pop-up picture. As shown in FIG. 13A, when a character shown by g is set to an object to be corrected, the screen is divided into four areas a, b, c, and d in which such a character is set to the center. In this case, the screen is divided while excluding areas of the character sizes f and e. The flow of processes will be explained with reference to FIG. 13B. The screen is divided into four areas on the basis of the data of the size and position of the character (1302). Then, in the divided portions, a portion having an area sufficient to enclose the detailed data display screen is selected (1303). The area having the highest priority is determined from the selected portion in accordance with predetermined priorities as shown by reference numeral 1301 (1304). The priorities are set in accordance with the order of the right lower, left lower, right upper, and left upper. By using the above method, the detailed data can be confirmed and corrected in a state in which a character to be corrected can be always seen irrespective of the position of the character to be corrected.

Figure 14:
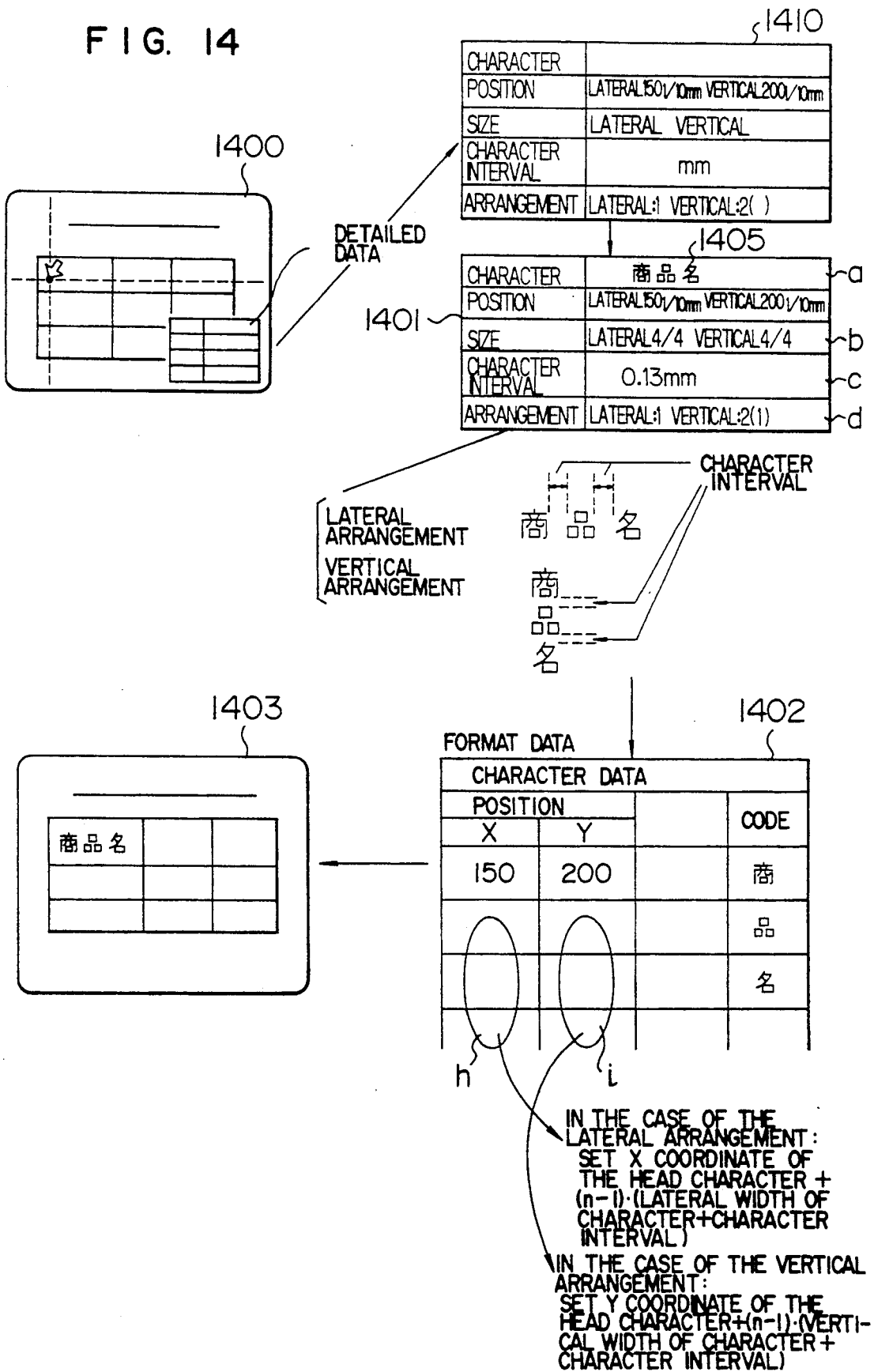
FIG. 14 is a diagram for explaining an example of an addition of characters according to another embodiment of the invention.

FIG. 14 is a diagram explaining an example of an addition of characters. In the case of adding characters, in many cases, characters are added as a character train instead of the addition of one character. In the case of adding a character train, there is generally used a method whereby the character interval is matched for every character and the cursors are positioned and set for every character in the lateral or vertical arranging direction. Such an adding process is more easily performed. That is, since the content of the character train, the start position, the interval between characters, and the arranging direction of the character train are necessary to add the character train, the format data of each character is automatically formed from the set data and displayed on the screen by merely setting those data into a table showing the detailed data in the pop-up picture.

In FIG. 14, the cursors are positioned to a screen displaying only ruled lines as shown by reference numeral 1400, a pop-up picture 1400 is displayed there. The position at which the cursors have been positioned is displayed as a content of the pop-up picture 1410. As shown by reference numeral 1401, the operator sets a character train 1405 (in this case, the character train 1405 corresponds to an article name) in the column of the character content in the pop-up picture and again checks whether the position of the character train is proper or not. If it is improper, the cursors are moved and the position of the character train is corrected and the size b of the character, the interval c between characters, and the arrangement d of the characters are designated. By executing only the above operations, the character train is added to the designated position on the screen as shown by a picture indicated by reference numeral 1403. The positions of the characters are calculated from the content designated by the detailed data and the character data regarding the characters are set into the format data table. In the case where the lateral arrangement is designated, an X coordinate h is set to a value of the X coordinate of the head character +(n−1)·(lateral width of character+interval between characters). In the case of the vertical arrangement, a Y coordinate i is set to the Y coordinate of the head character +(n−1)·(vertical width of character+interval between characters). n denotes a value indicating at which position from the head character in the character train the character of interest is located. Not only the correction of the characters but also the deletion and making of ruled lines, change in the type of line, and the like can be executed by the operator while observing the screen. For instance, to delete the ruled line, a delete key is pressed, the cursors are moved along the periphery of the ruled line to be deleted, and an execution key is pressed. An unnecessary display portion on the screen due to dirt or the like on the document sheet can be also easily deleted by similar operations.

Figure 15:
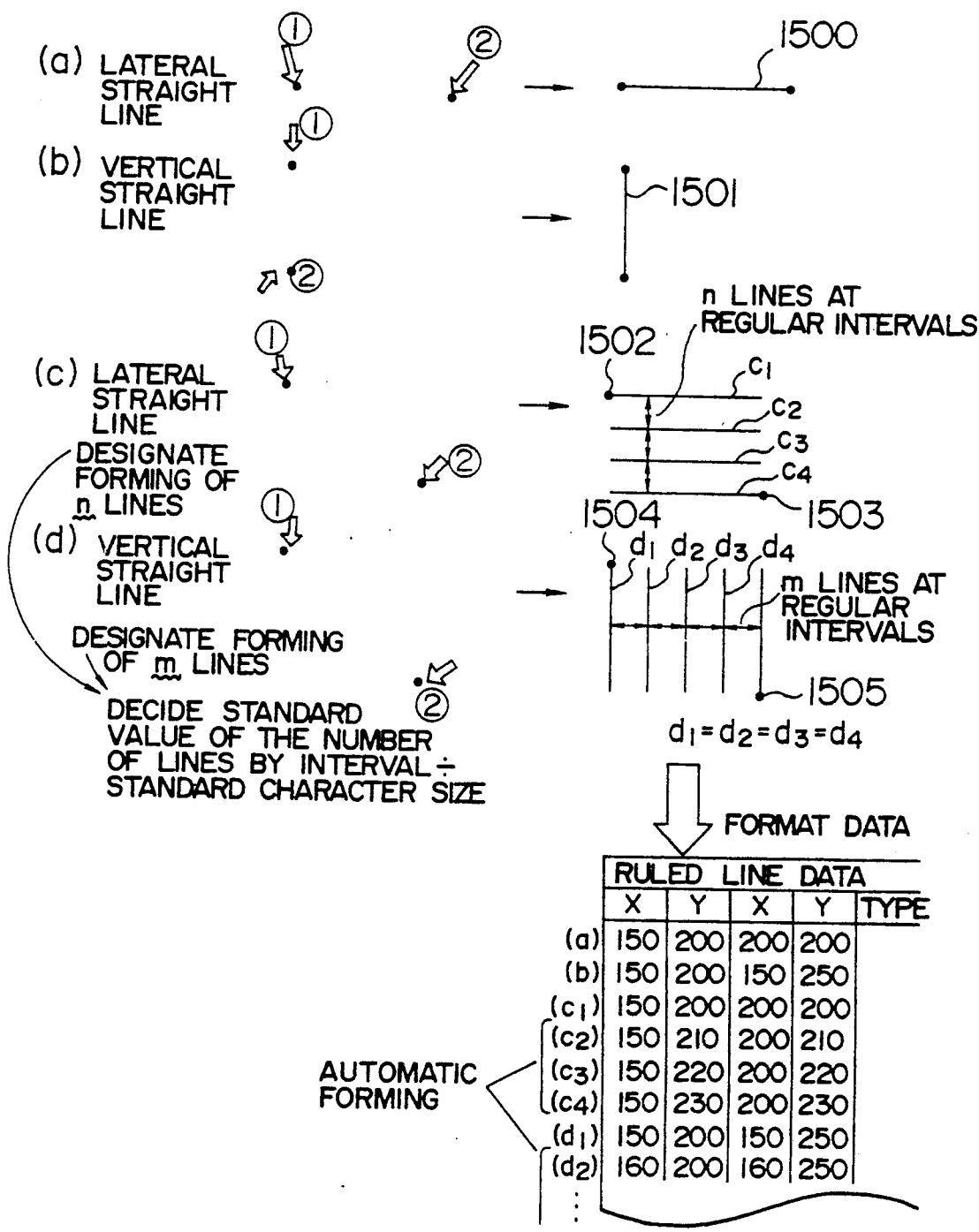
FIG. 15 is a diagram for explaining a method of forming ruled lines according to another embodiment of the invention.

FIG. 15 is a diagram explaining a method of making a ruled line. Generally, in the case of drawing one lateral line, by designating a start position and an end position by a point ① and a point ② as shown in (a), a lateral line as shown by reference numeral 1500 is formed. In the case of making one vertical line as well, by designating a start position and an end position by a point ① and a point ② as shown in (b), a vertical line as shown by reference numeral 1501 can be formed. Generally, when ruled lines are to be formed, it is a conventional method that ruled lines are formed one by one by the above method, requiring the same number of operations as the number of ruled lines to be formed. In many cases, the ruled lines which are used in a document mainly have a table form in which a plurality of lateral or vertical lines each having the same length are arranged. A table is formed by repetitively executing similar operations.

In the invention, a plurality of ruled lines are formed at time and the interval is also automatically determined. Further, even if the number of ruled lines increases, the number of operations is constant.

(c) and (d) in FIG. 15 show an embodiment of the invention. (c) relates to an example in the case of forming a plurality of lateral straight lines. A head position 1502 to draw a lateral straight line and an end position 1503 of the last one of a plurality of lateral straight lines are designated by points ① and ②. When the number of ruled lines is designated, the intervals among them are calculated so as to obtain an equal interval. The ruled lines of the designated number are formed. In the above example, four lines are designated. The interval between the ruled lines is obtained by dividing the difference value which is derived by subtracting the Y coordinate of ② from the Y coordinate of ① by the value which is obtained by subtracting 1 from the designated number of ruled lines. If the number of lines is not designated, the interval value is automatically calculated on the basis of the value of the standard character size and a plurality of ruled lines are automatically formed. Vertical straight lines are also formed in a manner similar to the case of the lateral straight lines. Vertical straight lines are formed at regular intervals merely by designating the start position by a point ① and the end position by a point ② and by designating the number of lines as shown in (c). Therefore, in the case of forming a table frame, the table frame can be formed by merely designating n lateral straight lines and m vertical straight lines. The formed ruled line data is set as format data.

Figure 16A:
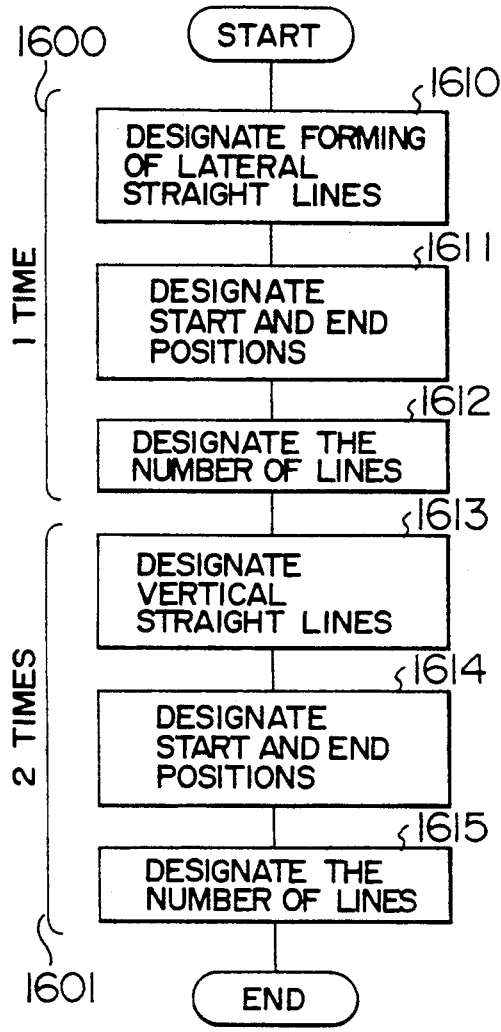
FIGS. 16A to 16C are flowcharts showing a flow of operations to form ruled lines and a diagram showing an example of matrix-like ruled lines according to another embodiment of the invention, respectively.
Figure 16B:
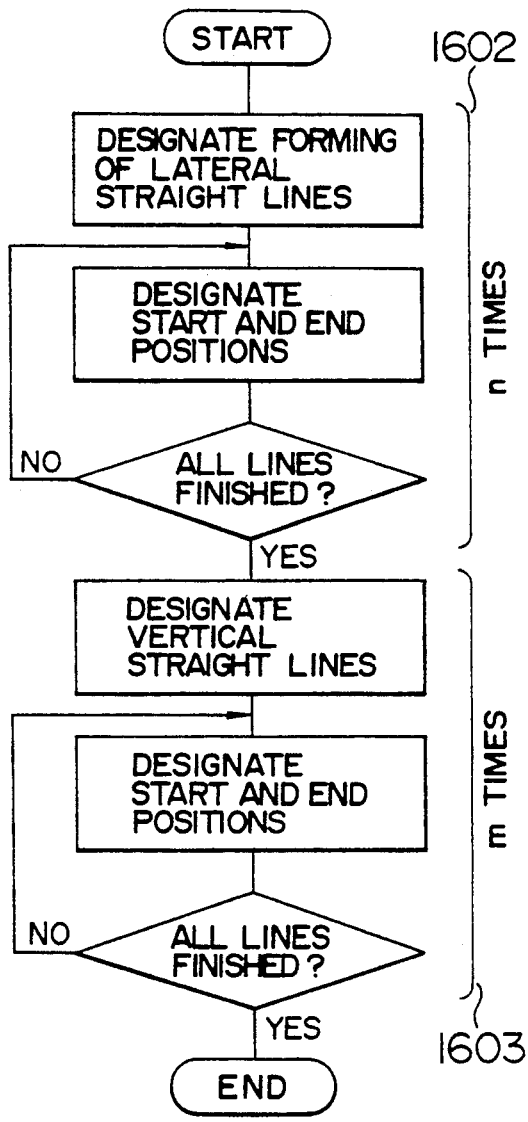
Figure 16C:
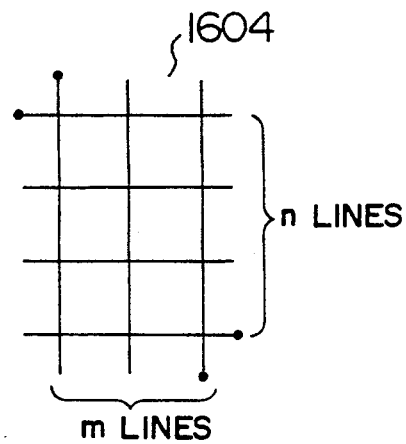

FIGS. 16A and 16B are flowcharts showing the flows of the operations when ruled lines are formed. FIG. 16A relates to a method according to the invention. FIG. 16B relates to a conventional method whereby ruled lines are set one by one. To make a format of a matrix type as shown by reference numeral 1604 in FIG. 16C, in FIG. 16A, n lateral straight lines are designated at a time and, after that, m vertical straight lines are designated at a time, and the format as shown at 1604 can be formed by a total two designating steps. In detail, in step 1600, a mode to form lateral straight lines is first designated (1610). Then, a start position and an end position of the lateral straight lines are designated (1611). The number of lateral straight lines to be drawn is subsequently designated (1612). In step 1601 as well, a mode to form vertical straight lines is similarly first designated (1613). Then, a start position and an end position of the vertical lines to be drawn are designated (1614). Finally, the number of vertical lines to be drawn is designated (1615). When the format as shown at 1604 in FIG. 16B is formed by the conventional method, an operation of 1602 in FIG. 16B is repeated a number of times which is equal to the number of lateral straight lines and, thereafter, an operation of 1603 is repeated a number of times which is equal to the number of vertical straight lines. According to the conventional operations, if the number of lines increases, the number of repetition times increases in correspondence to the increase in number of lines. However, according to the method of the invention, the number of operations is always equal to 2.

After completion of the correction and confirmation of the format data as mentioned above, a recognizing process is executed and a producing process of input/output fields is performed.

Figure 17:
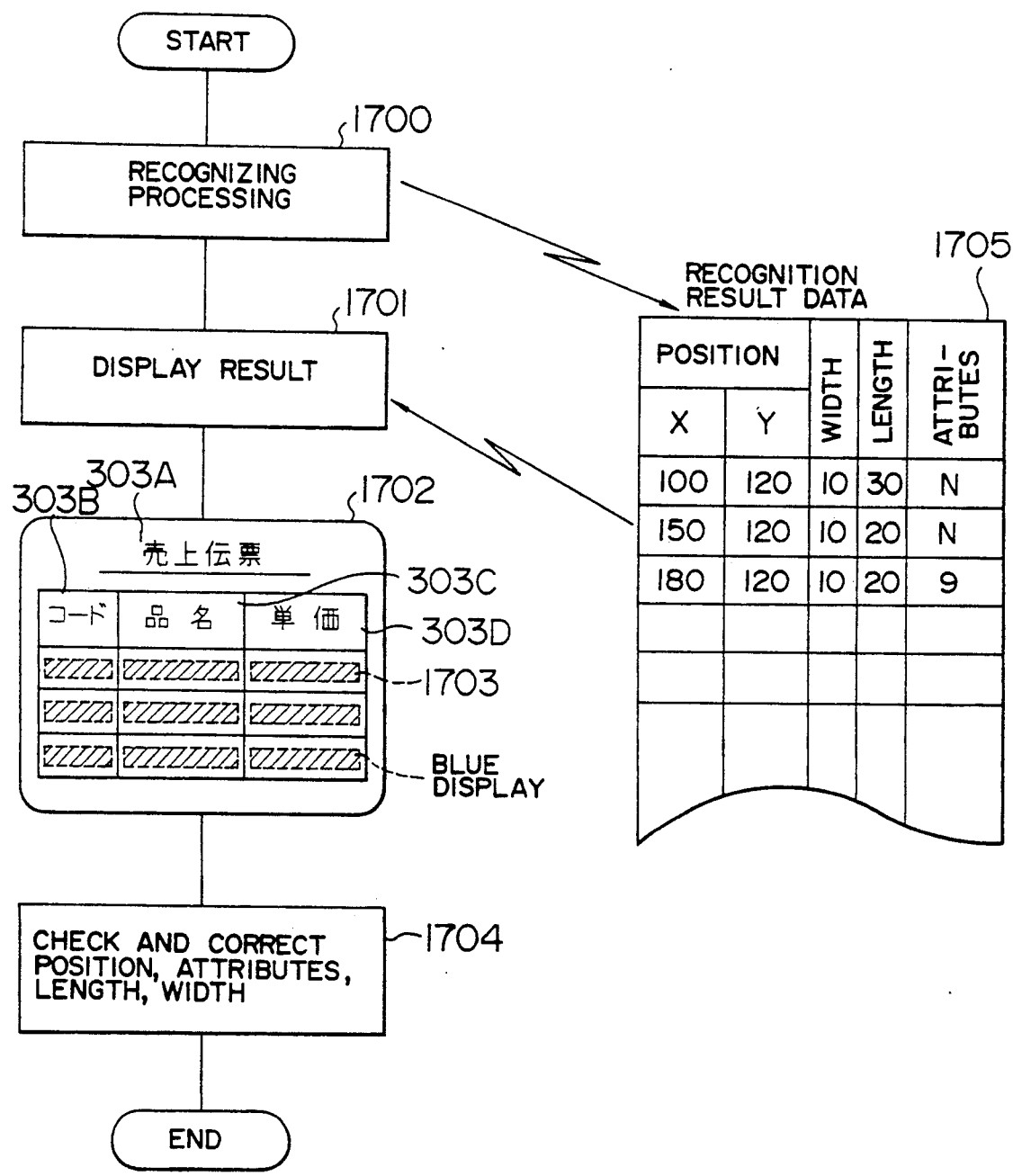
FIG. 17 is a diagram for explaining a flow of a display of input/output fields onto a screen according to another embodiment of the invention.

FIG. 17 is a diagram explaining the flow of a display of the input/output fields onto the screen. A recognizing process to see if blanks are input/output fields or not from the shape of ruled lines and the meanings of the terms on a document by using the data base 9 in the memory device 8 is performed (1700). Recognition result data 1705 is stored into the recognition result storage area 11 in the memory device 8. On the basis of the stored recognition result, the recognized input/output fields are displayed on the screen on which the format data such as ruled lines, characters, and the like have already been displayed (1701). A screen as shown at 1702 is displayed. As a result of the recognition, the produced input/output fields are color displayed on the screen as shown at 1702. The operator can correct the displayed recognition result by checking the position, attributes, length, width, and the like (1704).

Figure 18:
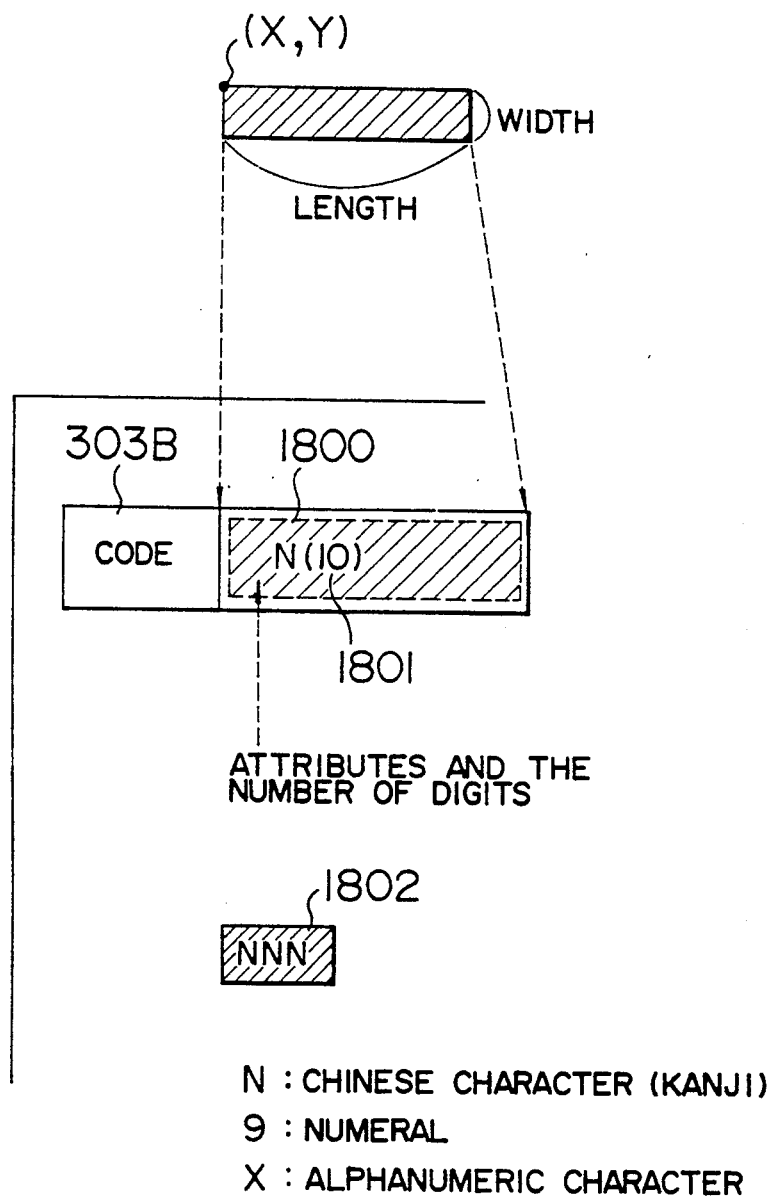
FIG. 18 is a diagram showing an enlarged format of input/output fields according to another embodiment of the invention.

FIG. 18 is an enlarged diagram of the input/output fields. On the basis of the recognition result data, the length and width of the input/output fields are color displayed in a display area of the input/output fields as shown by reference numeral 1800. Further, attributes and the number of digits as shown at 1801 are displayed in the display area of the input/output fields which has been color displayed. In the case of three or more digits, they are written in a form of an attribute character (the number of digits) as shown at 1801. In the case of three or less digits, the attribute characters as many as only the number of digits are written as shown at 1802. In the example shown in FIG. 18, the attributes are set to N and the number of digits is set to 10. Therefore, it will be understood that the input/output fields 1800 subsequent to the code 303B are the fields in which Chinese characters (Kanji) of ten characters are inserted.

The input/output fields of the recognition result can be also enlarged or reduced and displayed in a manner similar to the ruled lines or characters in the format data.

Figure 19:
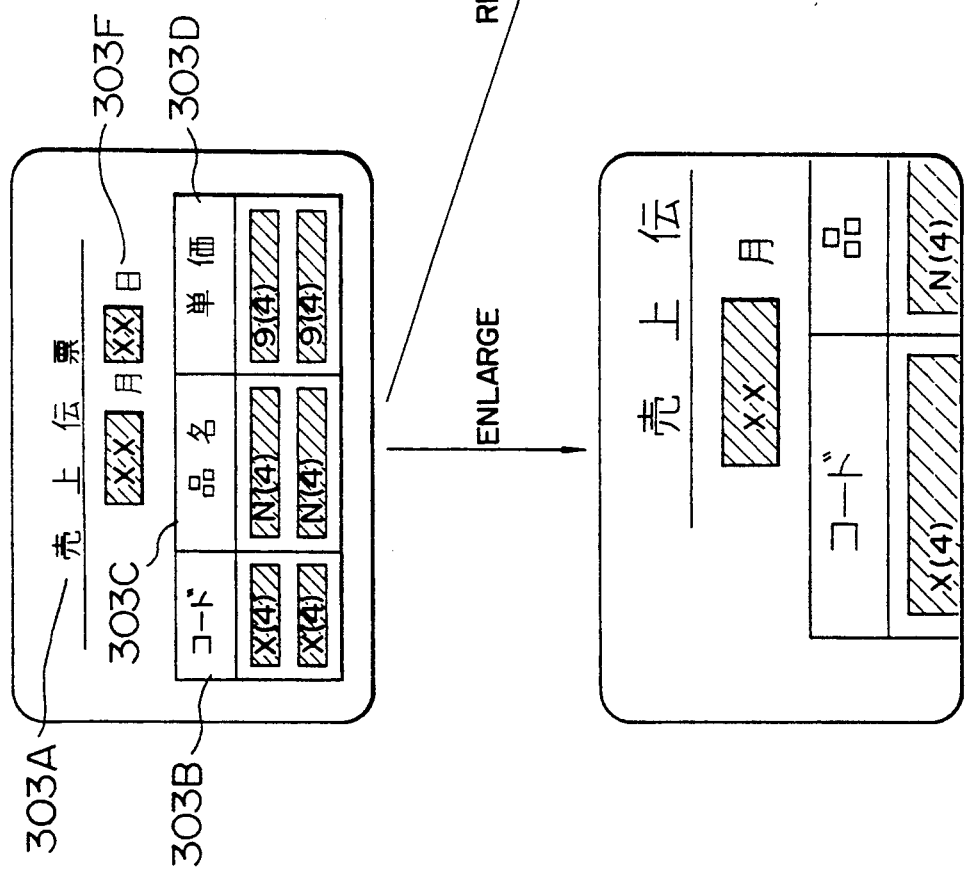
FIG. 19 is a diagram showing an example of an enlargement and a reduction of input/output fields according to another embodiment of the invention.

FIG. 19 is a diagram showing an example of the enlargement or reduction of the input/output fields. Upon enlargement or reduction, the blue portion in the input/output fields of the recognition result is also enlarged or reduced by the same magnification and displayed in a manner similar to the ruled lines or characters in the format data and can be corrected and confirmed in a state of the enlarged or reduced image. In the diagram, reference numeral 303F denotes a month and a day.

Upon correction and confirmation of the content, in a manner similar to the case of the format data, the cursors are positioned to the input/output fields of the recognition result to be corrected and confirmed or to a portion near the input/output fields, the execution key is input, the detailed data of the pop-up picture is displayed on the screen, and the correction and confirmation are executed on the pop-up picture.

FIG. 20A is a diagram showing an example of a pop-up picture of the input/output fields. When the cursors are positioned on the blue indication shown at a and the execution key is input, detailed data of the pop-up picture as shown at b is displayed. The displayed content corresponds to the result confirmed by the recognizing process. The input/output fields can be corrected by correcting the displayed content.

By the above method, the operator can successively check and correct the recognized content.

According to the embodiment, a format can be freely reduced and enlarged and the confirming and correcting operations can be executed by seeing the screen of the size at which the operator can easily carry out the correcting operations.

On the other hand, in the fine correction of the format data or input/output fields as well, the format can be easily corrected by changing the values on the screen of the detailed data displayed or by newly inputting data. In the case of ruled lines as well, a plurality of ruled lines can be formed at a time by inputting a start point of the ruled lines and a final point of the last ruled line and the number of ruled lines. The operating efficiency of the confirming an correcting operations can be improved.

By color displaying the recognized input/output field area and by displaying the attributes and the number of digits into such an area, the data can be confirmed at a glance. In the case where the operator wants to know further detailed data, by designating an area, such data can be checked and corrected by the detailed data screen of the area.

Figure 20:
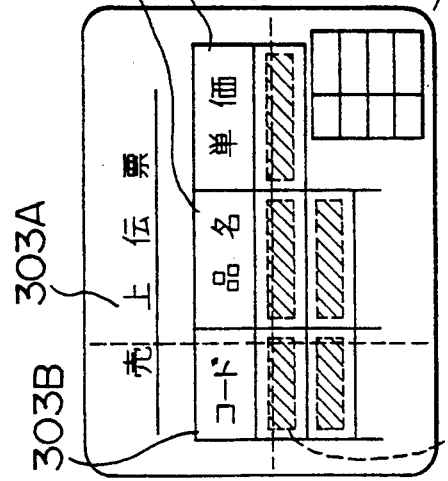
FIG. 20 is a diagram for explaining an example of a pop-up screen of input/output fields according to another embodiment of the invention.

Each column in FIG. 20 will now be described. Reference numeral 1900 denotes a column indicating that the displayed data is item data. Reference numeral 1901 denotes a column to show an item or the like; 1902 denotes a column indicative of item position in which the positions in the lateral and vertical directions are shown on a unit basis of 1/10 mm, respectively; 1903 a column to show an item length expressed by the number of rows and the number of columns; 1904 a column to show an interval between characters, in which an interval between rows and an interval between columns are shown on a unit basis of 1/10 mm; 1905 a column to show attributes, in which 1 indicates a numerical value, 2 represents an alphanumeric character, and 3 denotes a Chinese character (Kanji); 1906 a column to show the input or output, in which 1 indicates the input, 2 denotes the output, and 3 represents the input/output; 1907 a column to show a type, in which 1 indicates a headline, 2 denotes details, and 3 represents a summary; and 1908 indicates that the displayed data is detailed data. Reference numeral 1909 denotes a column to show the number of repetition, in which the numbers of repetition in the vertical direction and lateral direction are shown; 1910 a column to show a repetition interval, in which a vertical interval and a lateral interval are shown on a unit basis of 1/10 mm, respectively; 1911 a column to show total number; 1912 a column to show the printing direction, in which 1 indicates the vertical direction and 2 represents the lateral direction; 1913 a column to show that the displayed data is edit data; 1914 a column of Y, in which 1 indicates presence and 2 represents absence; 1915 a shift, in which 1 indicates a shift to the right, 2 represents a shift to the left, 3 denotes a shift to the center, and 4 shows that no shift is performed; 1916 a column to show that an enlargement is performed, in which 1 indicates the enlargement in the lateral direction, 2 denotes the enlargement in the vertical direction, 3 denotes the enlargement in both of the lateral and vertical directions, and 4 shows that no enlargement is executed; and 1917 a digit matching, in which 0 indicates that no digit matching is performed.

As will be understood from the above description, according to the embodiment, in the correcting process which becomes necessary when a program for computer processing is formed from a format of a document such as a slip or the like, the format can be freely enlarged and reduced, allowing the operator to carry out the correction with the size of the format set to be such a size that enables the operator to easily carry out any necessary correction which in turn allows the format data to be finely easily corrected and also allows the recognition result to be understood at a glance. Therefore, the confirming and correcting works can be performed by simpler operations and there is an effect such that the working time can be reduced.

An embodiment to automatically form a document format for a display on the screen according to the invention will now be described with reference to the drawings. In the embodiment, the format forming step 1006 described in FIG. 2 is more specifically shown. The document format obtained in step 1004 and displayed on the screen is similar to the document format of the original However, the document format obtained as a result of the execution of step 1006 and displayed on the screen has been corrected into the format which can be easily handled by the operator by the invention. Even in the case where the embodiment has been applied, the flow of the series of processes upon execution of the document processes is substantially the same as that of FIG. 2. Therefore, the repetitive description of FIG. 2 is omitted. In addition, since the whole construction is also similar to the construction shown in FIG. 1, its description is not repeated.

Figure 21:
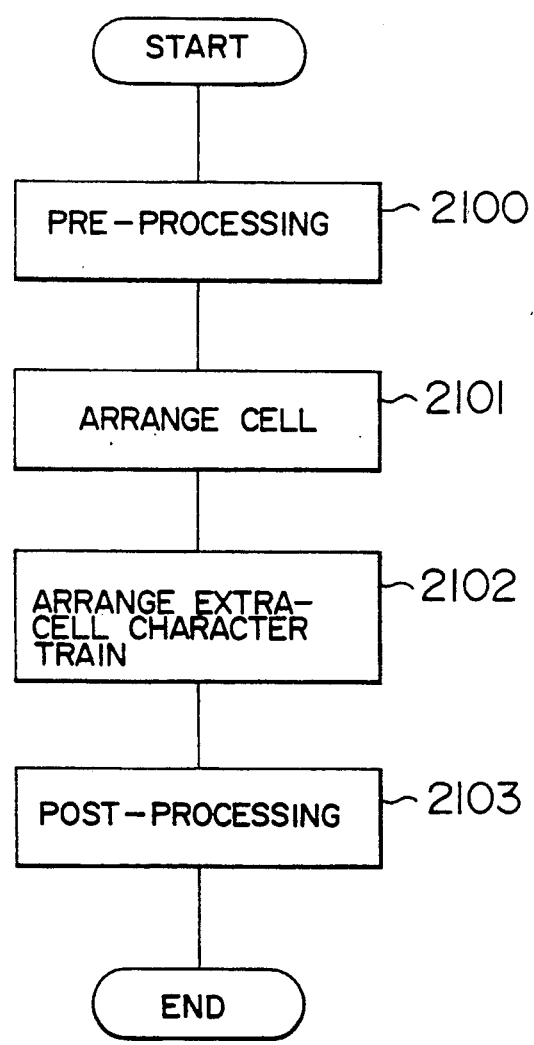
FIG. 21 is a flowchart showing the flow of a series of processes according to another embodiment of the invention.

FIG. 21 is a flowchart showing the flow of processes to automatically form a document format for a display on the screen according to an embodiment of the invention.

Pre-processings including obtaining a reference character size, extracting a character to be enlarged, and the like are executed (2100). A group of data (hereinafter, referred to as cells) which are surrounded by the ruled lines like a "customer name" 3100 as shown in FIG. 22, are arranged (2101). A group of data (hereinafter, referred to as extra-cell data) other than the above data surrounded by the ruled lines are arranged (2102). Post-processing such as reducing processing to prevent the result of the format production from overflowing the display screen, ordering processings to decide the order of processings, and the like are executed (2103).

Figures 22A, 22B, 22C:
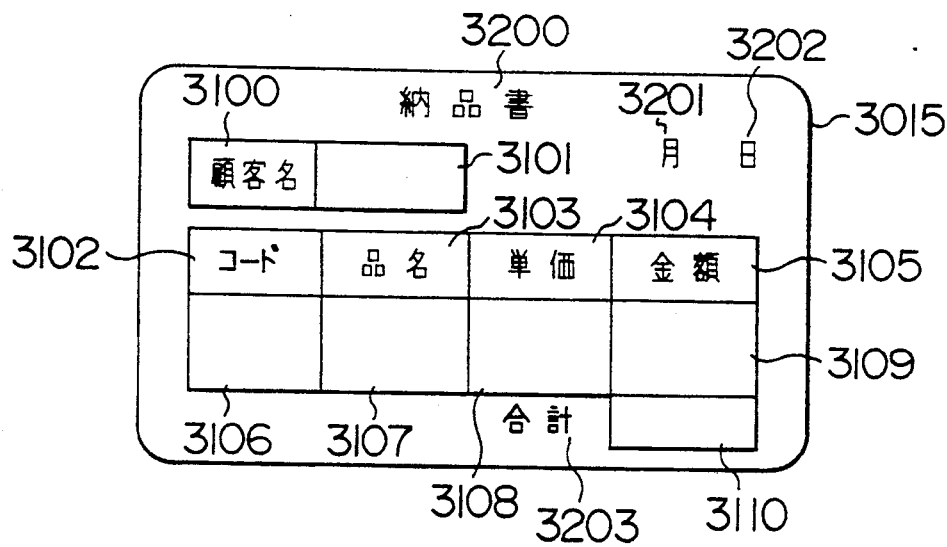
FIGS. 22A to 22C are diagrams showing a document format displayed on the display screen and a table of input data according to an embodiment of the invention.

FIGS. 22B, 22C, and 22A are diagrams showing examples of a cell data table, an extra-cell data table, and a document according to an embodiment of the invention, respectively.

In a slip 3015, data is separated into two kinds of data comprising the portions surrounded by the ruled lines and other portions. For instance, the data is separated into portions such as "customer name" 3100, "code" 3102, "article name" 3103, and the like and portions such as "delivery statement" 3200, "month" 3201, "day" 3202, and the like. The former data is called cell data. The latter data is called extracell data. The data 3100 to 3110 belongs to the cell data. The data 3200 to 3203 belongs to the extra-cell data. The above data is expressed by a character train and the start and end positions expressed on a unit basis of 1/10 mm. The above data is formed by inputting processing and the recognition processing. When the format is automatically formed as well, the above data is used and arranged, thereby forming the format.

FIG. 23 is a flowchart showing the flow of the pre-processing in the flowchart shown in FIG. 21 according to an embodiment of the invention.

The pre-processing (2100) comprises two processings, i.e., a processing (2200) to obtain a reference character size and a processing (2201) to extract a character to be enlarged. First, the size of one character on the document corresponding to one character on the display screen is obtained. The size of a character which is most frequently used among all of the characters in the document to be read is determined as a reference character size 3205. As shown in FIG. 24, a value in which a row pitch and a character pitch have been added is set. By using the above size, an arranging processing of the cells is subsequently performed.

A character to be processed as an enlargement character is now extracted. As shown in FIG. 25, a character size is compared with a value which is obtained by subtracting magnitudes of the row pitch and column pitch from the reference character size. If the character size is equal to or larger than a predetermined value, it is recognized as an enlargement character.

Figure 26:
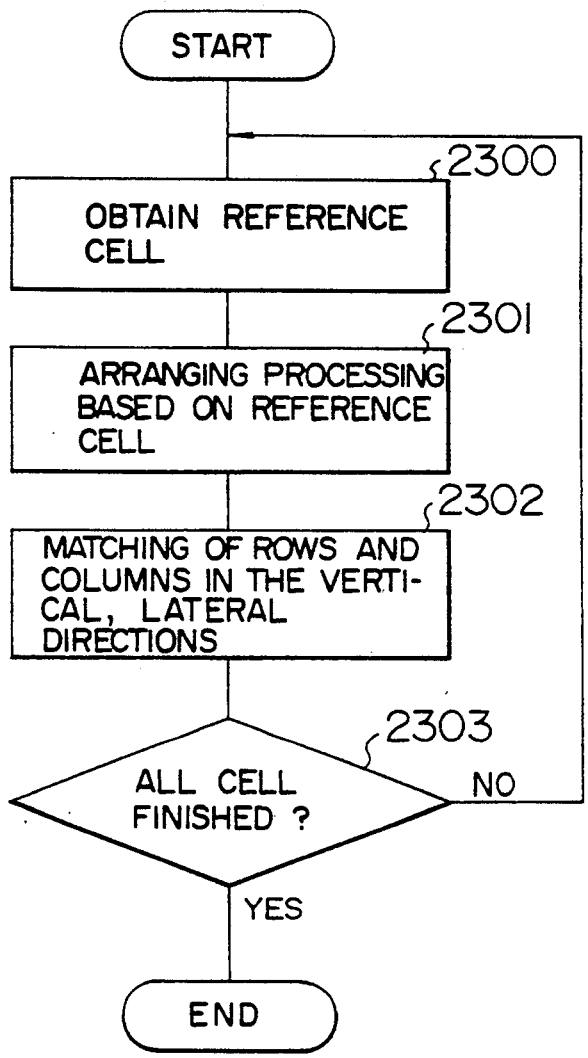
FIG. 26 is a flowchart showing the flow of arranging processes according to another embodiment of the invention.

FIG. 26 is a flowchart showing the flow of the arranging processes according to an embodiment of the invention.

A construction of the cells in a document will now be described with reference to FIG. 27.

An ordinary document form comprises groups of cells. The document can be arranged in a beautiful layout by arranging the cells on a group unit basis. The group of contiguous cells is called a block.

Figure 27:
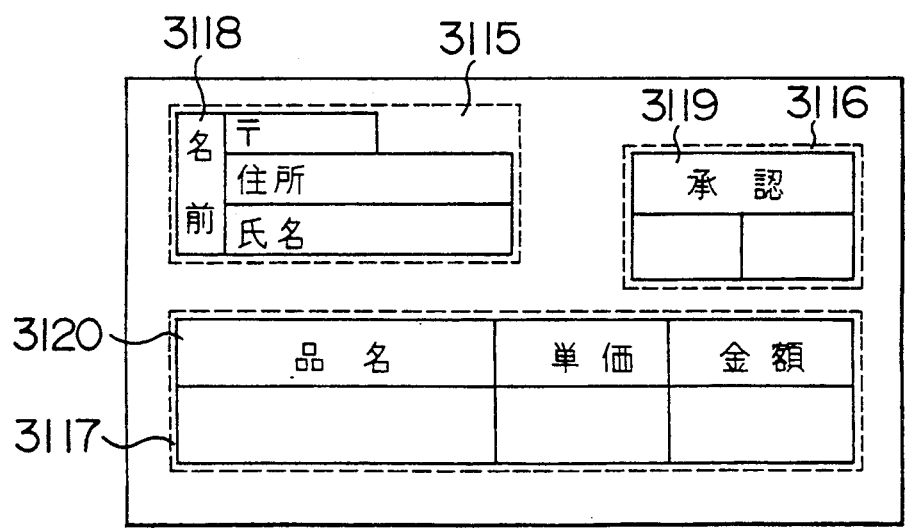
FIG. 27 is a diagram for explaining the relations among items according to another embodiment of the invention.

In FIG. 27, the document is separated into blocks 3115 (including the columns "name", "postal code", "address", and "name"), 3116 (the column "approval seal"), and 3117 (including the columns "article name", "unit price", and "amount of money"). A cell 3118 ("name"), 3119 ("approval"), or 3120 ("article name") at the leftmost top position in each block is called a reference cell. In the flowchart of FIG. 26, the reference cell is first obtained (2300). A start point and an end point of the reference cell are converted into a number of rows and a number of columns on the display screen. On the basis of those numbers, the position is also calculated with respect to each of the cells in the block and arrangement of the cells is performed (2301). Fine adjustments in the vertical and lateral directions are executed (2302). A check is made to see if all of the cells have been arranged or not (2303). If all of the cells have been arranged, the processing routine is finished. If NO, the next cell is arranged.

Figure 28:
FIG. 28 is a diagram showing a calculating method for converting read input data according to another embodiment of the invention.
Figure 28:
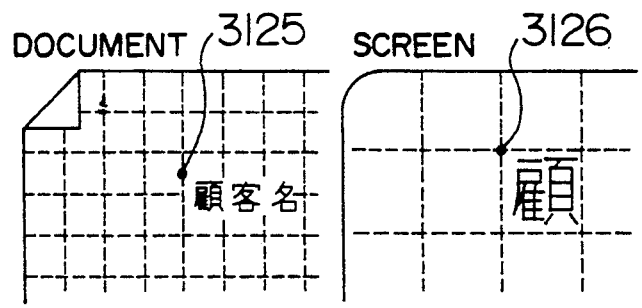

FIG. 28 is a diagram showing calculating equations to obtain the starting row and column numbers and the end row and column numbers of the reference cell.

The value of the position which is expressed on a unit basis of 1/10 mm on the document is divided by the reference character size and the resultant quotient is set as such a number. By the above method, the number of rows and the number of columns on the display screen are obtained. Thus, a position 3125 of "customer name" on the document is displayed at a position 3126 on the screen.

Figure 29:
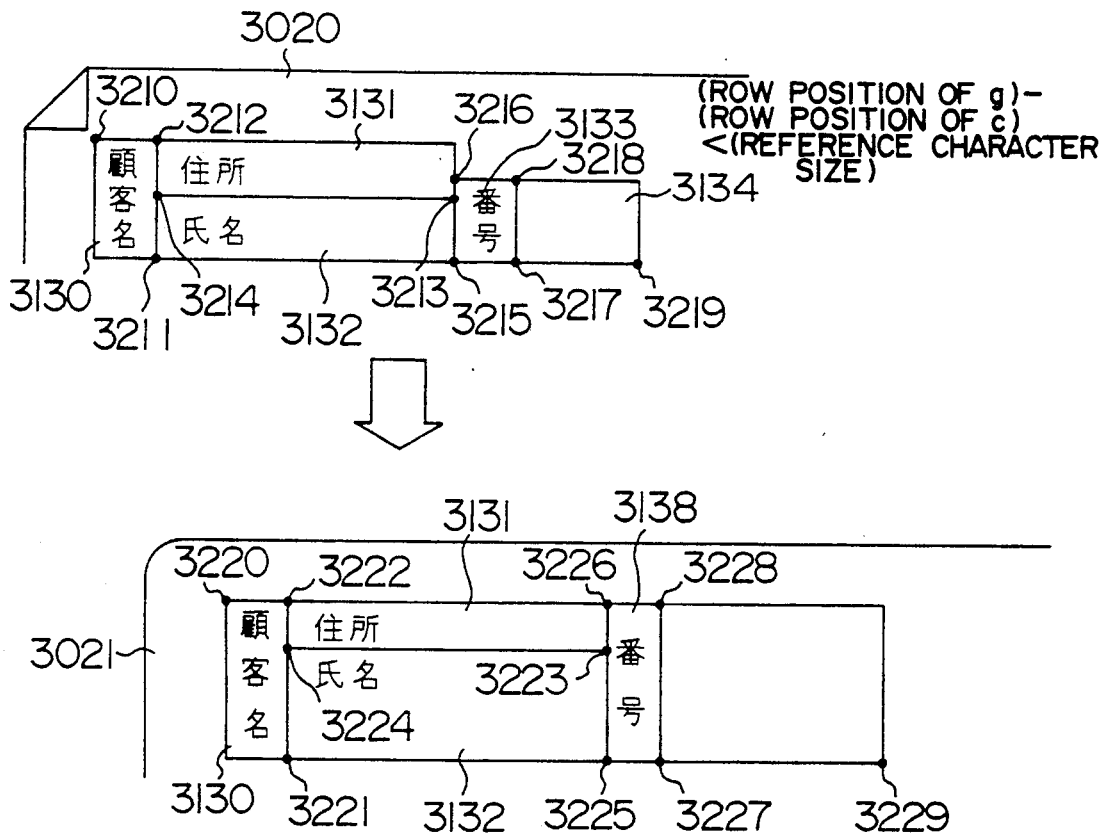
FIG. 29 is a diagram for explaining an actual arrangement example and a slip format storing table according to another embodiment of the invention.

FIG. 29 is a diagram of an example in the case where the arrangement of an embodiment of the invention has been executed.

A cell for "customer name" 3130 of a slip 3020 is set to a reference cell. A start point 3210 and an end point 3212 are matrix-calculated by the calculating method as shown in FIG. 28. A start matrix and an end matrix are obtained and are converted into a point 3220 and a point 3221 of a format 3021. A point 3222 in the format 3021 is set as a start point 3212 of a cell "address" 3131 of the document 3020 because the points of the start row and end column of the reference cell have the same value. As an end point 3223 of the cell for "address" 3131, since there is no reference, the number of rows and the number of columns are calculated on the basis of the value of the end point 3223, thereby obtaining the number of end rows and the number of end columns points 3224 and 3225 of the format 3021 are obtained as a start point 3214 and an end point 3215 of a cell for "name" 3132 of the slip 3020 by the numbers of end rows and end columns of the reference cell and the numbers of end rows and end columns of the cell "address" 3131.

Like cells for "number" 3133 and blank 3134, in the case where the start point starts from the midway of the previous cell and a blank within the reference character size exists, start points 3216 and 3134 are matched with the start row point 3210 of the reference cell. Therefore, the start point 3216 of "number" 3133 is set to a point 3226 of the format 3021. An end point 3217 is set to a point 3227 of the format 3021. Similarly, a start point 3218 of the blank cell 3134 is converted into a point 3228 of the format 3021 and an end point 3219 is converted into a point 3229. In the above case, although a character train in the cell for "number" 3133 is constructed by two characters, there are blanks of three characters in a cell 3138 of the format 3021 formed.

In the case where the format has been enlarged by adjusting as mentioned above, the character train in the cell is centered with a good balance. A table 3022 is formed by the above method. The cell number, the values of the position on the document, and the values which have been converted into rows and columns on the display are registered into the table 3022. After the cells have been arranged, the characters outside the cells are arranged. The characters outside the cells are arranged on the basis of the foregoing table. The positional relation between the arrangement position of the character train outside the cells and the cells near the character train is important. The correct arrangement cannot be obtained if the positions are merely simply converted into a matrix.

FIG. 30 is a diagram for explaining an example in the case where the arrangement of an extra-cell character train has been performed according to an embodiment of the invention.

In the arrangement of the extra-cell character train, the foregoing table formed by the positions of the cells is retrieved on the basis of the start position of the extra-cell character train and the start row and start column of the cell having the nearest value are obtained.

For instance, in FIG. 30, it is assumed that cells 3140 to 3143 are arranged as shown in a table 3145. To obtain a start position of an extra-cell character train for "year, month, day" 3144, a start row position of the table is retrieved on the basis of a start row position for "year, month, day" 3144, thereby finding the cell having the nearest value. In the example, the cell for "name" 3140 is found. The cell start row number 2 for "name" 3140 is set to a start row of the character train for "year, month, day" 3144. Similarly, a start column position of the table is retrieved on the basis of a start column for "year, month, day" 3144, thereby finding out the nearest cell for "amount of money" 3134. The start column number of this cell is the column number to be obtained. As a result, in the example, the arranging position of the character train for "year, month, day" 3144 is set to the 2nd row and the 8th column. Here, the arranging processing of the extra-cell character train is finished.

FIG. 31 is a flowchart showing the flow of processes in the post-processing shown in FIG. 21 according to an embodiment of the invention.

In the post-processing here, an adjusting processing (3400) of the formed format in order to accommodate it within the display screen and an order setting (3401) to efficiently execute the business affairs processing are executed.

Figure 32:
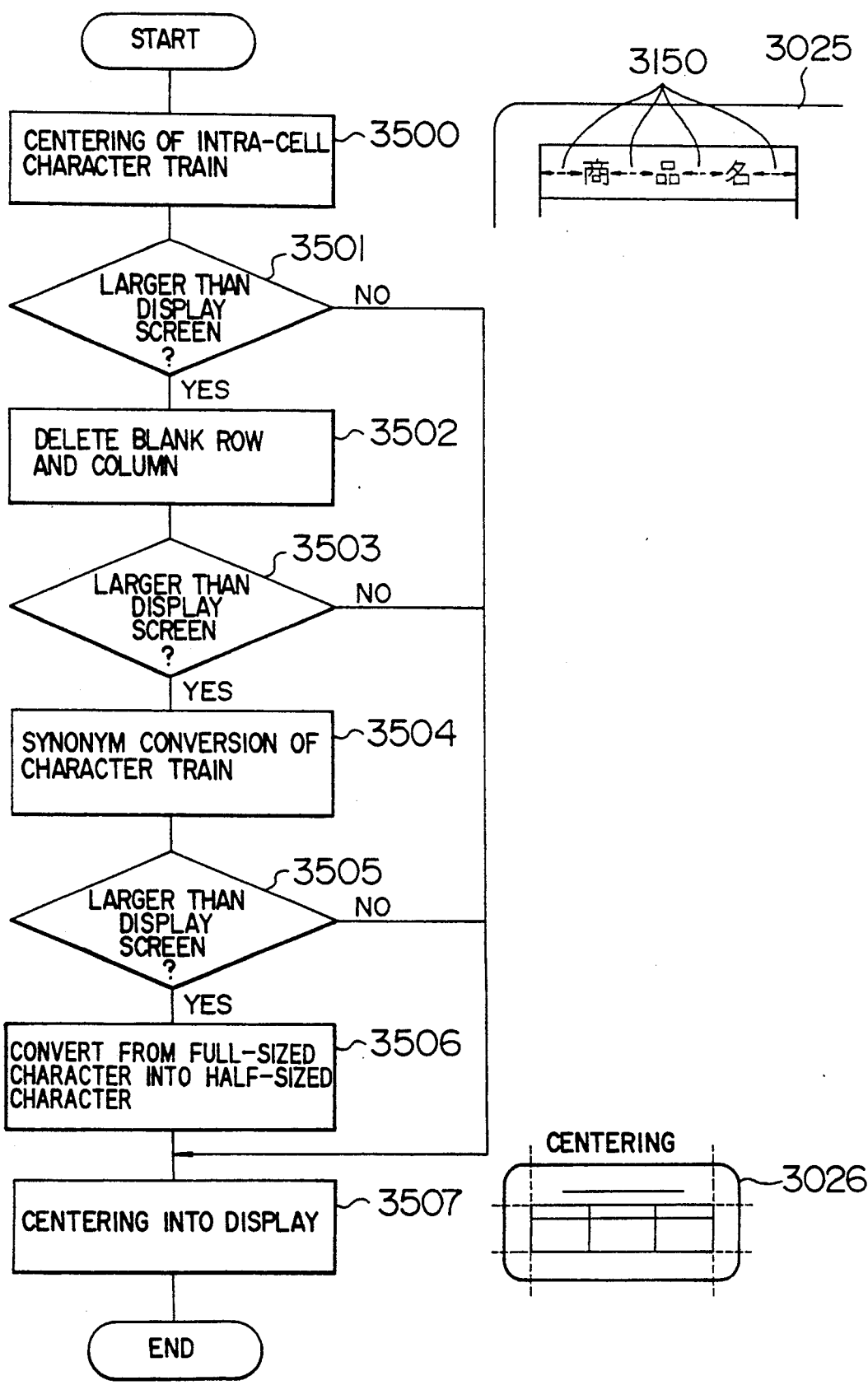
FIG. 32 is a detailed flowchart of an accommodating adjustment into the display screen according to another embodiment of the invention.

FIG. 32 shows a flowchart of the adjusting processing.

First, the centering of an intra-cell character train is executed (3500). A check is made to see if the formed format is larger than the display screen or not (3501). The centering of the intra-cell character train is performed by equalizing a character interval 3150 in, for example, a format 3025. If the format is larger than the display screen, blank rows and columns which occupy the largest area in the arrangement are deleted (3502). After completion of the deletion, a check is again made to see if the formed format is still larger than the display screen or not (3503). If it is still larger, the character train having synonyms is converted into a character train of the shortest synonym, thereby reducing the character train (3504). A check is again made to see if the format is larger than the display or not (3505). If it is still larger, the conversion from the full-sized character of the character train into the half-sized character is executed (3506). Finally, the centering adjustment of the formed format into the display screen is performed as shown in a format 3026 (3507) and the processing routine is finished.

In the flowchart of FIG. 32, after step 3506, the centering in the display screen is executed and the processing routine is finished. However, after step 3506, a check may be again made to see if the formed format is larger than the display screen or not, and if larger, a processing for reducing the number of digits of one row by dividing the character train written as one row in the long item column into a plurality of rows may be added.

FIG. 33 is a diagram for explaining an example of the synonym converting process in step 3504 in FIG. 32.

The phrase "address of the customer" 155 overflows the display screen because the item character train is larger than the number of input digits. In such a case, the character train of "address of the customer" 155 is synonym converted into a shorter character train such as "customer address" 157 by using data base 156. Due to this, a long character train can be reduced so as to be accommodated within the display screen.

FIG. 34 is a diagram for explaining an example of a converting process from the full-sized character into the half-sized character in step 3506 in FIG. 32.

A character or letter such as Katakana or the like in which a half-sized character exists is converted into the corresponding half-sized character. In the character train of words 3161 corresponding to "customer code", by converting a word corresponding to "code" into the half-sized character, such a character train can be accommodated within the display screen like words 3161 corresponding to "customer code".

Items are ordinarily processed in accordance with the order from upper item to lower item and from left item to right item. However, there is also a case where it is better to process items in the opposite order such as from right item to left item in dependence on the content of a document. For such a case, by executing a processing to automatically determine the processing order, items can be efficiently processed.

Figure 35:
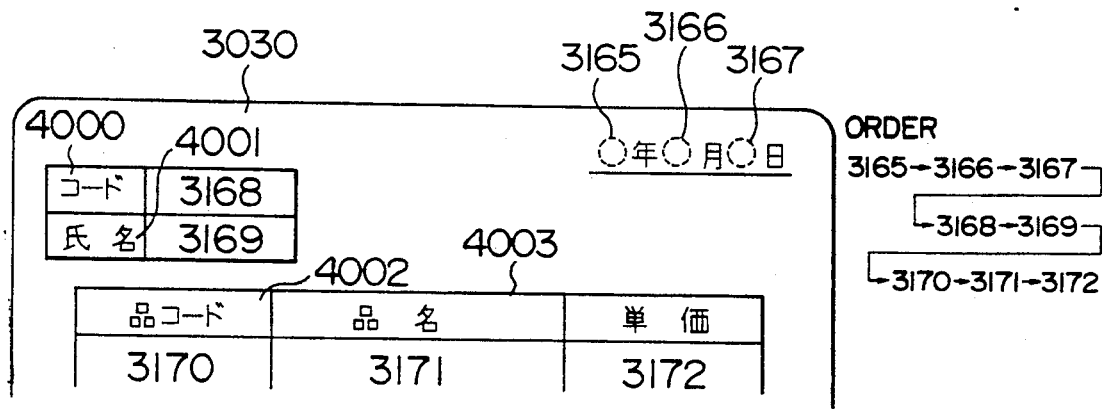
FIG. 35 is a diagram for explaining a method of deciding a processing procedure according to another embodiment of the invention.
Figure 35:
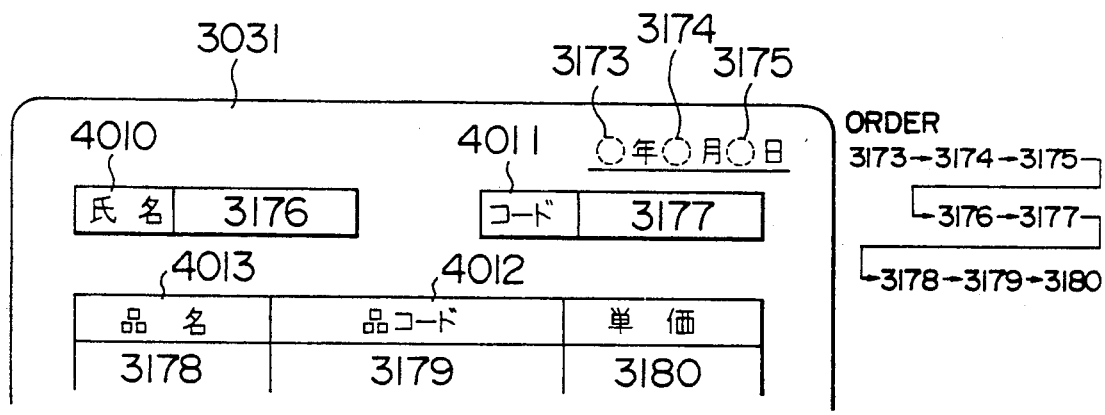
Figure 35:
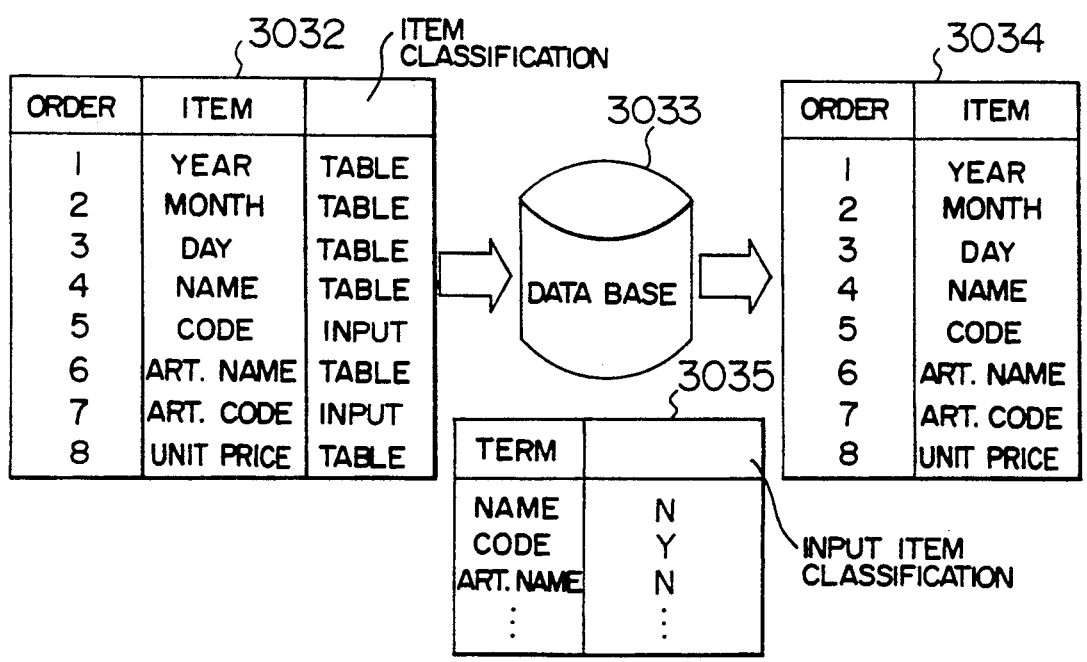

FIG. 35 is a diagram for explaining an example of the processing to determine the processing order according to an embodiment of the invention.

A slip 3030 relates to an example in which the orders have ordinarily been decided from left to right. On the other hand, a slip 3031 relates to an example including a processing opposite to the ordinary processing in accordance with the order from right to left.

In an ordinary processing order, year 3165, month 3166, and day 3167 are first automatically displayed. The operator inputs a code 4000 regarding a name 4001, for instance, a name code 3168 added for every customer. The computer searches the name corresponding to the name code 3168 from the data base and automatically displays it in a name field 3169. Similarly, with respect to an article code 4002 as well, by inputting an article code from the operator, and article name 4003 is automatically displayed in an article name field 3171. Therefore, as far as the slip 3030 is concerned, the above processing order is proper. However, in the case of the slip 3031, field positions "name" 4010, "code" 4011, "article code" 4012, and "article name" 4013 differ from those of the slip 3030. If they are processed from upper item to lower item and from left item to right item, the name field and the article name field come before the code regarding the name is input and before the article code is input, respectively, so that the processes are troublesome. In such a case, therefore, a processing to change the processing order to the order such as 3173→3174→3175→3177→3176→ 3179→3178→3180 is executed. Such an exchange is performed by using the data base.

After completion of the arrangement adjusting process, a field table 3032 is first formed. The corresponding item name is searched from an input item distinguishment table 3035 of a data base 3033 on the basis of the item names (year, month, day, name, code, article name, article code, unit price). A check of distinguishment is made to see if the searched item name relates to the input item which the operator must input or not. In the table 3035 shown in the figure, the name and the article name are not the input items but the code is an input item. For a display item which has some relation with an input item, a check is made to see if the display item is placed before the input item or not. If placed before, the order is rearranged. In an example of a document 3031, "code" and "article code" are the input items among the items of the field table 3032. The display items "name" and "article name" which relate to the input items are placed before the above two items. Therefore, the order is rearranged to the order of a processing order table 3034, that is, the order of year, month, day, name, code, article name, article code, and unit price. The correct processing order can be set by using the data base as mentioned above.

According to the embodiment, a format to be processed by the computer is automatically formed by merely reading the format of the document from the reading apparatus, eliminating a process of formation by the operator, resulting in a remarkable improvement in work efficiency.

On the other hand, since the format is adjusted to the optimum size so as to be accommodated on the display screen, when the operator executes the business affair processing, he or she can rapidly execute the confirmation and the like and the operation becomes easy.

As will be obviously understood from the above description, according to the embodiment, by merely inputting a format of a document from the reading apparatus such as an OCR or the like, a screen format to be processed by the computer can be formed and the format is adjusted to the optimum size so as to be accommodated within the display and is generated. Therefore, the job step such that the user forms on the display is eliminated and there is an effect such that the efficiency of the user side is extremely improved.

What is claimed is:

1. A method of forming and processing a display on a screen of a form document including at least one cell into which character or numerical value data is to be written and a portion outside said cell into which at least character or numerical value data is to be written, comprising:
   a first step of reading data indicating a format of said form document from a recording medium;
   a second step of determining a character size per character displayed on the screen from the data which has been read;
   a third step of arranging a display of a cell on the screen using the determined character size;
   a fourth step of arranging said character or numerical value data in the portion outside the cell on the screen and displaying a format similar to said format on the screen;
   a fifth step of confining the display of said similar format to an area of said screen, including compressing the cell and the character data; and
   a sixth step of dividing a processing procedure of items of said similar format displayed on the screen.

2. A method according to claim 1, wherein said fifth step further includes at least one of deleting a blank row or a blank column, executing a synonym conversion of a character train by using a data base, executing a conversion from full-sized character into a half-sized character and, rearranging said cell and character data into a plurality of rows.

3. A method according to claim 1, wherein said sixth step includes discriminating a character train of each item by a matching with a data base.

4. A document forming system in which a form document including at least one cell into which character or numerical value data is to be written and a portion outside said cell into which at least character or numerical value data is to be written is formed on a screen and processed, comprising:
   means for reading data indicating a format of said form document from a recording medium;
   means for determining a character size per character displayed on the screen from the data which has been read;
   means for arranging the cell on the screen according to said decided character size;
   means for arranging the character data in the portion outside the cell on the screen and displaying a format similar to said format on the screen;
   means for compressing at least one of the cell and the character or numerical value data so that said similar format doesn't overflow the area of the screen; and
   means for deciding a processing procedure of items of said similar format displayed on the screen.

5. A system according to claim 4, wherein said recording medium includes a document sheet.

6. A system according to claim 4, wherein said recording medium includes a floppy disk of a word processor.

7. A system according to claim 4, wherein said compressing means includes means for executing a synonym conversion of a character train to reduce to size of said similar format.

8. A system according to claim 4, wherein said form document includes plural rows and columns, and wherein said compressing means includes means for deleting at least one blank row or blank column to reduce the size of similar format.

9. A system according to claim 4, wherein said form document includes a plurality of rows, and wherein said compressing means includes means for rearranging a single row of said cell and said character data into a plurality of rows to reduce the size of said similar format.

10. A method of forming and processing a display on a screen of a form document including at least one cell into which character or numerical value data is to be written and a portion outside said cell into which at least character or numerical value data is to be written, comprising:
    a first step of reading data indicating a format of said form document from a recording medium;
    a second step of determining a character size per character displayed on the screen from the data which has been read;
    a third step of arranging a display of a cell of the screen using the determined character size;

a fourth step of arranging said character or numerical value data in the portion outside the cell on the screen and displaying a format similar to said format on the screen;

a fifth step of confining the display of said similar format to an area of said screen, including executing a synonym conversion of a character train by using data stored in a data base to reduce the size of said similar format; and a sixth step of deciding a processing procedure of items of said similar format displayed on the screen.

11. A method according to claim 10, wherein said sixth step includes discriminating a character train of each item by a matching with a data base.

12. A method of forming and processing a display on a screen of a form document having plural rows and columns including at least on cell into which character or numerical value data is to be written and a portion outside said cell into which at least character or numerical value data is to be written, comprising:

a first step of reading data indicating a format of said form document from a recording medium;

a second step of determining a character size per character displayed on the screen from the data which has been read;

a third step of arranging a display of a cell on the screen using the determined character size;

a fourth step of arranging said character or numerical value data in the portion outside the cell on the screen and displaying a format similar to said format on the screen;

a fifth step of confining the display of said similar format to an area of said screen, including deleting at least one of a blank row and a blank column to reduce the size of similar format; and a sixth step of deciding a processing procedure of items of said similar format displayed on the screen.

13. A method according to claim 12, wherein said fifth step further comprises, after deletion of a blank row or a blank column, rearranging a single row of said cell and said character date into a plurality of rows to further reduce the size of said similar format.

14. A method according to claim 12, wherein said sixth step includes discriminating a character train of each item by a matching with a data base.

* * * * *